US009479885B1

(12) United States Patent
Ivanov et al.

(10) Patent No.: US 9,479,885 B1
(45) Date of Patent: Oct. 25, 2016

(54) METHODS AND APPARATUSES FOR PERFORMING NULL STEERING OF ADAPTIVE MICROPHONE ARRAY

(71) Applicant: Motorola Mobility LLC, Chicago, IL (US)

(72) Inventors: Plamen A Ivanov, Schaumburg, IL (US); Joel Clark, Woodridge, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 14/962,712

(22) Filed: Dec. 8, 2015

(51) Int. Cl.
*H04B 17/00* (2015.01)
*H04R 29/00* (2006.01)
*H04M 1/02* (2006.01)
*H04R 3/00* (2006.01)

(52) U.S. Cl.
CPC ........... *H04R 29/005* (2013.01); *H04M 1/026* (2013.01); *H04R 3/005* (2013.01); *H04R 2203/12* (2013.01); *H04R 2430/21* (2013.01); *H04R 2430/25* (2013.01)

(58) Field of Classification Search
CPC .... H04R 29/005; H04R 3/005; H04M 1/026
USPC ......... 455/67.11, 63.1, 67.12, 67.13; 381/91, 381/92, 95, 102, 122
See application file for complete search history.

(56) References Cited

U.S. PATENT DOCUMENTS 5,473,701 A * 12/1995 Cezanne ................ H04R 1/406 381/92
8,116,508 B2 2/2012 Xu et al.
8,204,247 B2 * 6/2012 Elko ...................... H04R 3/005 381/92
8,213,659 B2 7/2012 Mottonen et al.
8,879,771 B2 11/2014 Mellow et al.
9,124,977 B2 9/2015 Ozcan
9,143,875 B2 9/2015 Ozcan
2010/0080409 A1 4/2010 Xu et al.
2010/0329496 A1 12/2010 Mottonen et al.
2011/0164141 A1 7/2011 Tico et al.
2011/0248935 A1 10/2011 Mellow et al.
2011/0268292 A1 11/2011 Suvanta et al.
2012/0099829 A1 4/2012 Moberg et al.
2012/0257776 A1 10/2012 Ozcan
2012/0294450 A1 11/2012 Ozcan
2013/0077810 A1 3/2013 Mellow et al.
2013/0144615 A1 6/2013 Rauhala et al.
2013/0223631 A1 8/2013 Greuet et al.
2013/0226593 A1 8/2013 Magnusson et al.
2013/0272557 A1 10/2013 Ozcan et al.
2014/0189510 A1 7/2014 Ozcan
2014/0193019 A1 7/2014 Yan et al.
2014/0254817 A1 9/2014 Vilermo et al.
2014/0375310 A1 12/2014 Greuet et al.
2015/0030159 A1 1/2015 Ozcan (Continued)

*Primary Examiner* — Tuan Pham

(57) ABSTRACT

Configuring an adaptive microphone array to gather signals from a main lobe of the array, and configuring the array to reduce side interference gathered from sources that are not situated within the main lobe. A memory stores test signals gathered by the array at a plurality of predetermined angular bearings with reference to the array in an anechoic chamber. Signals gathered in real time are processed to provide a preliminary output and preliminary weights. The test signals are retrieved from memory. The preliminary weights are applied to the test signals to provide null steering weights. The null steering weights and the preliminary output are processed to reduce or minimize the amplitude response of the array at the angular orientation.

21 Claims, 13 Drawing Sheets

(56) References Cited

U.S. PATENT DOCUMENTS

2015/0049899 A1 2/2015 Mellow et al.
2015/0071449 A1 3/2015 Ozcan
2015/0304776 A1 10/2015 Backman et al.

* cited by examiner

METHODS AND APPARATUSES FOR PERFORMING NULL STEERING OF ADAPTIVE MICROPHONE ARRAY

FIELD OF THE DISCLOSURE

The present disclosure relates to audio processing and, more particularly, to methods and apparatuses for performing null steering of an adaptive microphone array.

BACKGROUND OF THE DISCLOSURE

A microphone array is a group of two or more microphones arranged in a specific geometric configuration and used to gather and process acoustic signals. One advantage of using a microphone array over a single microphone lies in the fact that the array adds dimensional information to the signal acquisition process. Accordingly, beam forming techniques may be used to provide a main lobe for receiving signals of interest that arrive from one or more desired directions. Beam forming increases the gain of the microphone array in one or more desired directions, while decreasing the gain in other directions to thereby improve the signal-to-noise ratio of a desired signal.

Adaptive microphone arrays may be configured to reduce side interference from sources of acoustic energy that are not situated in the main lobe of the array, as well as sources of acoustic energy that change position with reference to the array. Temporal and spatial information included in the signals collected by the microphone array are analyzed using array signal processing and adaptation procedures to formulate a filter transfer function for the array. The filter transfer function provides the microphone array with a fixed or dynamically changing directional pattern that reduces the response of the array to side interference. A null, or direction of minimum response, is provided in a particular direction along a specific fixed bearing, or along a set of specific bearings. The direction of minimum response may, but need not, change as a function of time. Due to the nature of commonly used adaptation algorithms that seek to minimize the error signal at an output of an adaptive filter, the adaptive microphone array tends to cancel a most significant source of interference that carries the most energy relative to other sources of interference. This cancellation may or may not be useful, depending on the geometry of the array, the locations of the sources of interference with respect to the array, and the number of sources of interference that exist. This approach may or may not provide sufficient cancellation of the sources of noise, especially in cases where enhancement for robust speech recognition is needed. In general, adaptive microphone arrays allow a coherent source of interference to be tracked, and if necessary, cancelled.

BRIEF SUMMARY OF THE INVENTION

In at least some embodiments, the present invention relates to a method that includes configuring an adaptive microphone array to gather signals from one or more directions in a main lobe of the array, and configuring the array to reduce side interference gathered from one or more sources of acoustic energy that are not situated within the main lobe of the array. The method further includes configuring a computer-readable memory to store a plurality of respective test signals gathered by the array at a corresponding plurality of predetermined angular bearings with reference to the array in an anechoic chamber, free-field environment, or other interference and noise-free and echo-minimized acoustic environment, processing one or more signals gathered in real time to provide a preliminary output signal and a set of preliminary weights, determining an angular orientation with reference to the array at which an amplitude response of the array is to be reduced or minimized, retrieving a test signal from the plurality of respective test signals stored in the computer-readable memory based upon the determined angular orientation, applying the set of preliminary weights to the retrieved test signal to provide a set of null steering weights, and processing the set of null steering weights and the preliminary output signal to reduce or minimize the amplitude response of the array at the angular orientation.

In at least some embodiments, the present invention relates to an apparatus that includes an adaptive microphone array configured to gather signals from one or more directions in a main lobe of the array, and configured to reduce side interference gathered from one or more sources of acoustic energy that are not situated within the main lobe of the array. A computer-readable memory, operatively coupled to the array, is configured to store a plurality of respective test signals gathered by the array at a corresponding plurality of predetermined angular bearings with reference to the array in an anechoic chamber, free-field environment, or other interference and noise-free and echo-minimized acoustic environment. The array further comprises a processing mechanism for processing one or more signals gathered by the array in real time to provide a preliminary output signal and a set of preliminary weights, repeatedly determining a set of one or more angular orientation with reference to the array at which an amplitude response of the array is to be reduced or minimized in real time, retrieving a test signal from the plurality of respective test signals stored in the computer-readable memory based upon the determined set of one or more angular orientations, applying the set of preliminary weights to the retrieved test signal to provide a set of null steering weights by adapting a mirror array using pilot or test signals, and processing the set of null steering weights obtained from the mirror array, and the preliminary output signal to reduce or minimize the amplitude response of the array at the angular orientation.

Moreover, in at least some embodiments, the present invention relates to a non-transitory computer-readable memory encoded with a computer program comprising computer readable instructions recorded thereon for execution of a method that includes configuring an adaptive microphone array to gather signals from one or more directions in a main lobe of the array, and configuring the array to reduce side interference gathered from one or more sources of acoustic energy that are not situated within the main lobe of the array. The method further includes configuring a computer-readable memory to store a plurality of respective test signals gathered by the array at a corresponding plurality of predetermined angular bearings with reference to the array in an anechoic chamber, free-field environment, or other interference and noise-free and echo-minimized acoustic environment, processing one or more signals gathered in real time to provide a preliminary output signal and a set of preliminary weights, retrieving a test signal from the plurality of respective test signals stored in the computer-readable memory based upon the determined angular orientation, applying the set of preliminary weights to the mirror array and to the retrieved test signal and adapting the mirror array to provide a set of null steering weights, and processing the set of null steering weights and the preliminary output signal to reduce or minimize the amplitude response of the real-time array at the angular orientation.

The set of preliminary weights are used to determine an initial response of the adaptive microphone array. For example, the set of preliminary weights determine one or more initial angular bearings or initial directions in which the adaptive microphone array decides to cancel interference signals. These initial direction or directions may not represent the cancellation direction or directions that are desired. Accordingly, a set of revised, updated, or final steering weights are obtained, starting with the preliminary weights, and operating on the set of pilot signals, based on external information as to a direction in which the adaptive microphone array is to be steered. Therefore, starting with the preliminary weights, external information is used to determine which of the plurality of respective test signals is retrieved and used (i.e. in which angular orientation to steer cancellation).

According to a further set of illustrative embodiments, the adaptive microphone array includes a real-time adaptive microphone array and a mirrored adaptive microphone array. The mirrored adaptive microphone array is adapted from the preliminary weights to provide the revised, updated, or final steering weights, and then passes the final steering weights to the real-time adaptive microphone array to operate on real-time signal without extra interference from the test signals used in the mirror array.

DETAILED DESCRIPTION

Figure 1:
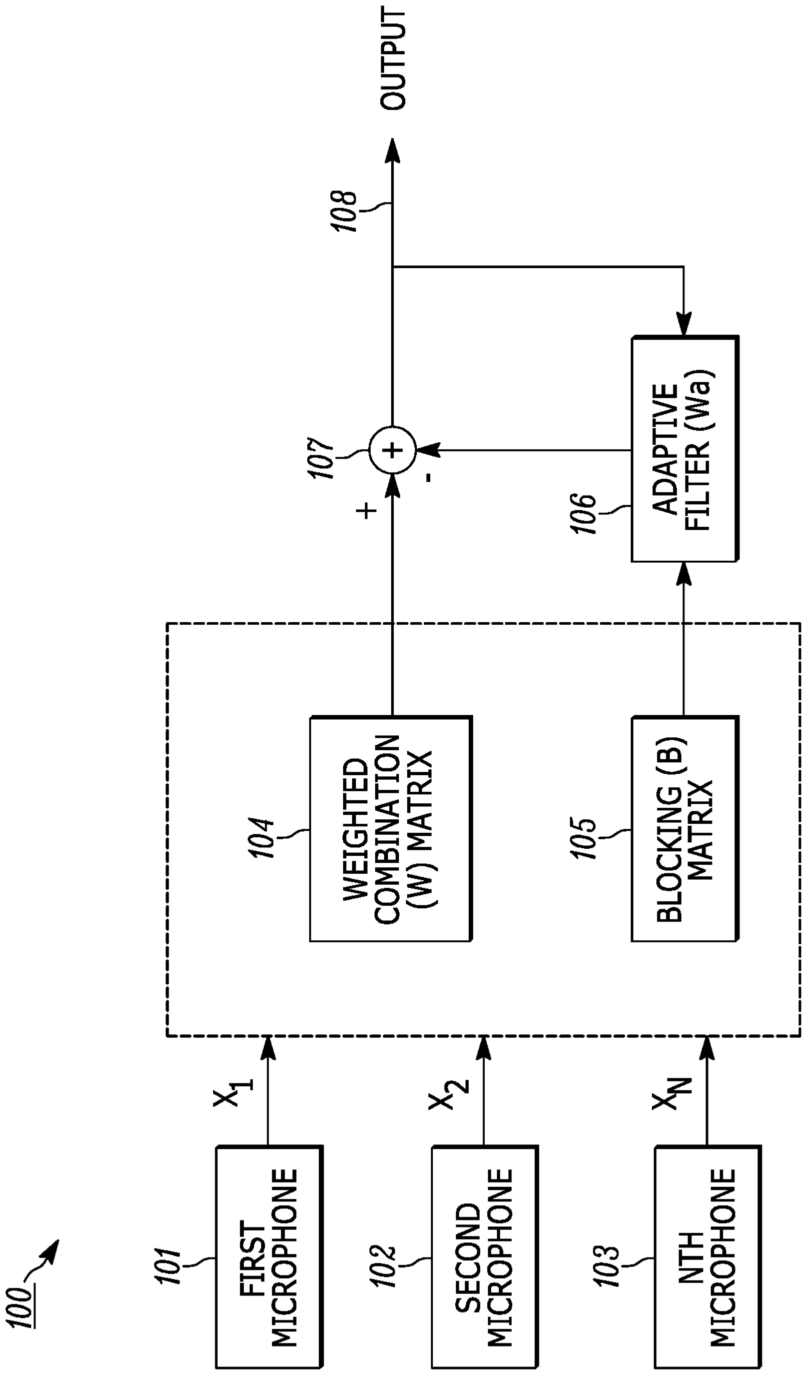
FIG. 1 PRIOR ART
FIG. 1 is a hardware block diagram of a first illustrative prior art real-time adaptive microphone array for cancelling side interference.

According to a set of exemplary embodiments, an adaptive microphone array is configured for gathering signals from a desired signal source in a main lobe of the array. This functionality is achieved by adjusting the relative amplitudes and phases of the signals produced by each of a plurality of individual microphones in the array, and then combining the adjusted signals into a single composite output signal. The adaptive microphone array is further configured for reducing side interference from one or more undesired sources of acoustic energy that are not situated in the main lobe. Side interference is reduced by utilizing a first circuit that will orient a null towards the desired signal source, thus primarily including the side interference, as well as a second circuit that will provide maximum sensitivity towards the main lobe including the desired signal source, where the second circuit may also receive a portion of the side interference.

The first circuit provides the null by generating a difference signal between a first pair of microphones in the array. This difference signal primarily includes signals gathered from the sides of the array, and little or no signals gathered from the main lobe of the array. The second circuit provides maximum sensitivity towards the main lobe by generating a summed signal from a second pair of microphones. This summed signal primarily includes signals gathered from the main lobe of the array, along with some signals from the sides of the array. Alternatively or additionally, the second circuit may provide a cardioid pattern that is oriented towards the desired source.

An adaptive filtering mechanism may be employed to perform an interference cancellation procedure. The first signal produced by the first circuit and containing little or no signal from the desired source is filtered and subtracted out of a second signal produced by the second circuit and including the desired source as well as interference. The adaptive filtering mechanism may be programmed to provide the microphone array with a fixed directional pattern that reduces the response of the array to side interference, or with a directional pattern that changes dynamically to reduce the response of the array to side interference that exhibits motion relative to the microphone array.

For explanatory purposes, assume that a null, or direction of minimum response, is provided in a particular direction along a specific fixed bearing. This null may be regarded as an angular bearing, determined with reference to the array, for which the interference cancellation procedure converges. In circumstances where a source of side interference is expected to remain in a fixed position relative to the array, this fixed null approach may provide acceptable results. However, this approach may not be effective for reducing side interference in situations where the source of interference is in motion, where the array itself is in motion, or where a multiplicity of sources of interference are each situated at different angular bearings with respect to the array. Moreover, the adaptive microphone array may track and cancel at least one of the sources of interference (a dominant source), but this dominant source may or may not comprise a particular source of interference for which cancellation is desired. For example, the particular source of interference may comprise an interference source that is most likely to distract a listener or a speaker, or that is most likely to obscure intelligibility of the speaker.

According to a set of illustrative embodiments disclosed herein, methods are provided where a null of the adaptive microphone array can be steered in a direction so as to cancel the particular source of interference for which cancellation is desired, instead of allowing the adaptive microphone array to automatically converge on a null that may not provide maximum attenuation of the source of interference for which cancellation is desired. This functionality is provided by using a mirrored adaptive microphone array with an initial configuration, and applying a set of test signals to the mirrored adaptive microphone array, where the test signals are selected so as to provide maximum attenuation of the source of interference for which cancellation is desired.

FIG. 1 is a hardware block diagram of an illustrative prior art real-time adaptive microphone array 100. The array 100 array is configured for gathering signals from one or more desired directions in a main lobe of the array 100, and is also configured for reducing side interference gathered from one or more sources of acoustic energy that are not situated within the main lobe of the array 100. The array 100 includes a respective plurality of microphones, such as a first microphone 101, a second microphone 102, and an $N^{th}$ microphone 103, that are configured for gathering a corresponding plurality of signals $X_1$, $X_2$, and $X_N$ in real time.

The real-time adaptive microphone array 100 relies on orthogonalizing space, such that a first set of signals comprising signals from a desired target, and a second set of signals comprising undesired interference signals, are both included in a weighted combination (W) matrix 104. The W matrix 104 provides an output comprising some combination of the multiple microphone signals from the first, second, and Nth microphones 101, 102, and 103. A blocking (B) matrix 105 provides an output that ideally includes only the second set of signals, representing the interference signals. An adaptive filter Wa 106 generates an adaptively filtered output signal by applying a set of weights to the output of the B matrix 105, and a summer 107 subtracts the adaptively filtered output signal from the output of the W matrix 104 to provide an array output signal 108. The weights of the adaptive filter Wa 106 are selected such as to minimize the presence of the second set of signals in the array output signal 108. Thus, the presence of the interference signals is minimized in the array output signal 108.

Figure 2:
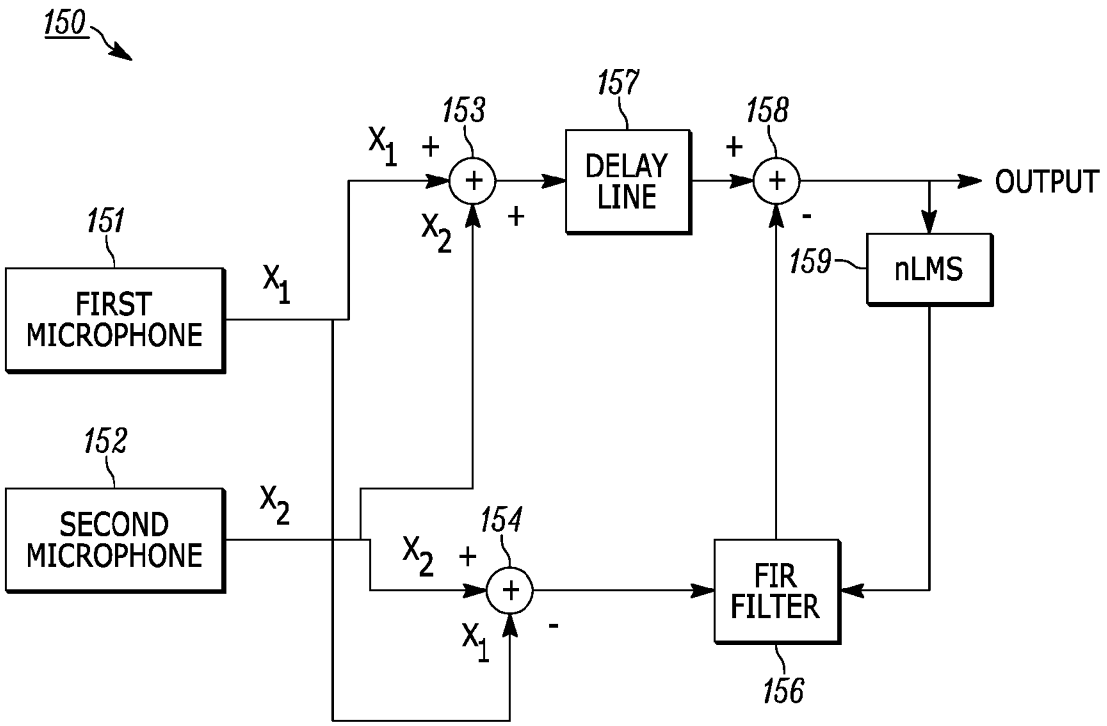
FIG. 2 PRIOR ART
FIG. 2 is a hardware block diagram of a second illustrative prior art real-time adaptive microphone array for cancelling side interference.

FIG. 2 is a hardware block diagram of an illustrative prior art real-time adaptive microphone array 150 for cancelling side interference. A first output signal from a first microphone 151 is applied to a first non-inverting input of a first summer 153. A second output signal from a second microphone 152 is applied to a second non-inverting input of the first summer 153. The first summer 153 generates a sum of the first and second output signals to provide a spatially defined directional pattern having a maximum sensitivity in a direction perpendicular to a line that connects or joins the first and second microphones 151 and 152. This direction of maximum sensitivity may be regarded as an intended look-up direction of the array. The sum provided by the first summer 153 is fed to an input of a delay line 157. An output of the delay line 157 is applied to a non-inverting input of a third summer 158.

A second summer 154 is used to invert either the first output signal from the first microphone 151 or the second output signal from the second microphone 152 prior to summing the first and second output signals, to generate a difference signal between the first microphone 151 and the second microphone 152. The difference signal provides a minimum sensitivity along the look-up direction of the array, and provides a maximum sensitivity in a direction defined by the line connecting the two microphones. Thus the maximum sensitivity direction of the summation branch at the output of the first summer 153 coincides with the minimum sensitivity of the difference branch at the output of the second summer 154 of the array 150. The output of the difference branch at the output of the second summer 154 is then filtered by a finite impulse response (FIR) filter 156, which is trained using an adaptive algorithm such as normalized least mean squares (nLMS) 159, for example, to remove a maximum common signal that is present in both the sum and difference branches by means of a third summer 158. This maximum common signal is located to the sides of the look-up direction of the array 150. The nLMS algorithm represents a class of adaptive filter used to mimic a desired filter by determining a set of filter coefficients that produce a least mean square of an error signal. The error signal represents the difference between a desired signal and an actual signal. The nLMS algorithm constitutes a stochastic gradient descent method in that the filter is adapted based on the error at the current moment in time.

The arrays described in conjunction with FIGS. 1 and 2 may provide acceptable results as long as speech leakage is minimal (or ideally non-existent) in the output of the B matrix 105 (FIG. 1), or in the output of the second summer 154 (FIG. 2). In at least some embodiments or circumstances, speech leakage may be reduced or eliminated by implementing the sum and difference arrays using a larger number of microphones. Moreover, the look-up direction of the array can be steered by adding appropriate delays on one (or more of) the microphone signals. But there are practical limits to the maximum number of microphones that can be used, and there are also limitations with regard to the DSB approach. Reducing leakage to a tolerable level may prove difficult or impossible to achieve.

The use of a DSB in either of the arrays 100, 150 of FIG. 1 or 2 presents challenges in the way that a directional spatial response pattern is formed. The directivity does not remain constant across a broad range of audible frequencies, but rather, the directivity is a function of frequency. Also, in the general case of a broad-side array such as the DSB, the directivity is symmetrical, exhibiting a maximum sensitivity on both sides of a line connecting or joining the two (or more) microphones 101, 102 (FIG. 1), or the two (or more) microphones 151, 152 (FIG. 2).

Another approach is to use a differential microphone array (DMA) that forms a signal oriented along an intended look-up direction comprising a main lobe of the array. Differential arrays are of relatively constant directivity (up to a specific frequency, dependent on the geometry of the array), and allow minimum sensitivity (a null) to be directed at two arbitrary angles, axially symmetric to the line connecting the two or more microphones. The differential array is an end-fire array, and the maximum sensitivity of the array is along the line connecting the two or more microphones.

Figure 3:
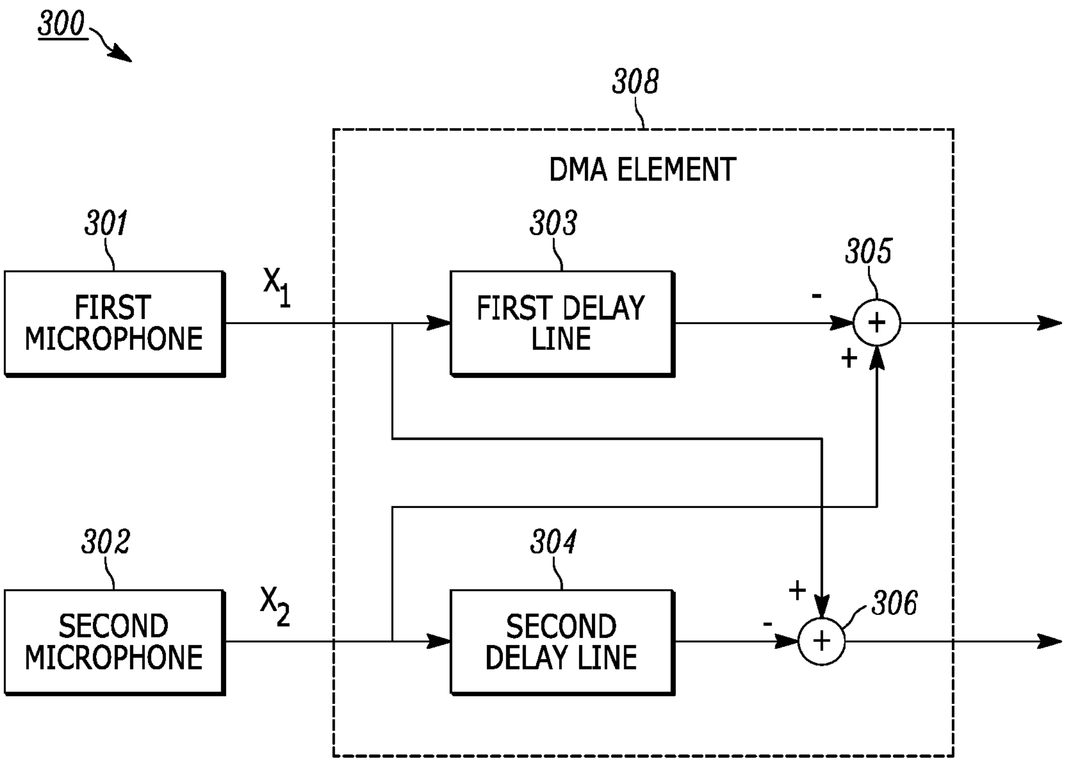
FIG. 3 PRIOR ART
FIG. 3 is a hardware block diagram of a first prior art differential microphone array.

FIG. 3 is a hardware block diagram of a prior art differential microphone array 300. In the differential microphone array 300, a first signal from a first microphone 301 is applied to a first delay line 303 that provides a first delay. A second signal from a second microphone 302 is applied to a second delay line 304 that provides a second delay. For illustrative purposes, the first delay could be of a time duration that is identical to the second delay, or alternatively, the second delay may be of a time duration that is different from the first delay. Also, for example, in some embodiments either of the first delay line 303 or the second delay line 304 can provide a frequency dependent delay.

The first signal from the first microphone 301 is delayed with respect to the second signal from the second microphone 302 by means of the first delay line 303, and the delayed first signal is subtracted from the second signal using a first summer 305. Likewise, the second signal from the second microphone 302 is delayed with respect to the first signal from the first microphone 301 by means of the second delay line 304, and the delayed second signal is subtracted from the first signal using a second summer 306.

The amount of delay introduced by the first and second delay lines 303, 304 and the geometry of the array 300 determine the direction of the null(s) formed by the array 300. For example, the first summer 305 may provide an output signal that illustratively implements a cardioid-shaped spatial response pattern, with the null of the cardioid directed to the left of the array 300, and with the main lobe of the cardioid directed to the right of the array 300. The second summer 306 may provide an output signal that illustratively implements a cardioid-shaped spatial response pattern, with the null of the cardioid directed to the right of the array 300, and with the main lobe of the cardioid directed to the left of the array 300. The first delay line 303, the second delay line 304, the first summer 305, and the second summer 306 together comprise a differential microphone array (DMA) element 308.

The delay introduced by the first and second delay lines 303, 304 may, but need not, be a function of frequency. It should be appreciated that any one or more of the delay lines 303, 304 (or otherwise) can take any of a variety of forms depending upon the embodiment or circumstance and, for example, can be an integer sample delay, a fractional sample delay, a frequency dependent delay, or a delay filter. Also, implementation may be provided in the time domain or the frequency domain. The array 300 conceptually illustrates how a set of processing elements (delay lines 303, 304 and summers 305, 306) may be used to produce signals with opposing spatial directivities, such as the right-oriented cardioid and left-oriented cardioid discussed previously.

Figure 4:
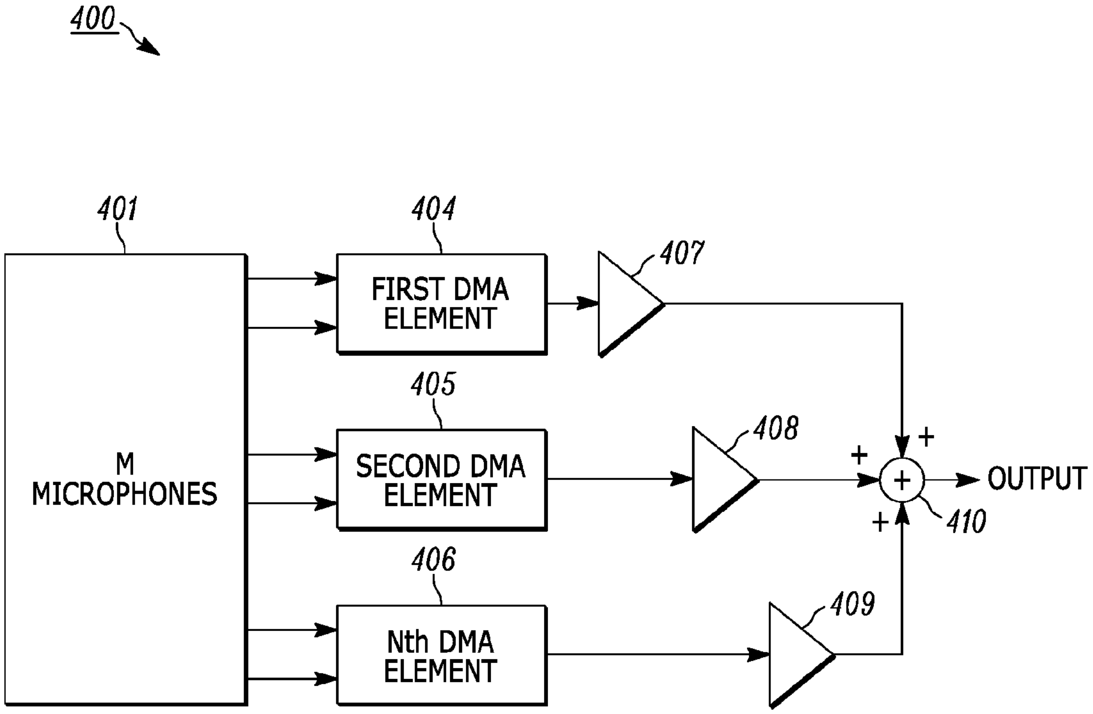
FIG. 4 PRIOR ART
FIG. 4 is a hardware block diagram of a second prior art differential microphone array.

FIG. 4 is a hardware block diagram of another prior art differential microphone array 400. The array 400 includes a plurality M of microphones 401, where M is a positive integer greater than one. Each of respective microphones of the plurality M of microphones 401 generates a corresponding microphone output signal. For explanatory purposes, assume that the plurality M of microphones 401 includes at least a first, a second, a third, and a fourth microphone. A first microphone output signal from the first microphone is fed to a first input of a first differential microphone array (DMA) element 404, and a second microphone output signal from the second microphone is fed to a second input of the first DMA element 404. Likewise, a third microphone output signal from the third microphone is fed to a first input of a second DMA element 405, and a fourth microphone output signal from the fourth microphone is fed to a second input of the second DMA element 405. For purposes of illustration, the first microphone output signal is fed to a first input of an Nth DMA element 406, and the fourth microphone output signal is fed to a second input of the Nth DMA element 406. Each of the first, second, and third DMA elements 404, 405 and 406 may be identical or similar to the DMA element 308 of FIG. 3.

An output of the first DMA element 404 is fed to an input of a first amplifier 407, an output of the second DMA element 405 is fed to an input of a second amplifier 408, and an output of the Nth DMA element 406 is fed to an input of an Nth amplifier 409. Each amplifier may provide frequency dependent amplification. An output of the first amplifier 407 is fed to a first non-inverting input of a summer 410. An output of the second amplifier 408 is fed to a second non-inverting input of the summer 410. An output of the Nth amplifier 409 is fed to an Nth non-inverting input of the summer 410. An output from the summer 410 is regarded as the output of the array 400. The characteristics of the first, second, and Nth DMA elements 404, 405 and 406 may each be adjusted, along with the gains provided by each of the first, second, and third amplifiers 407, 408, and 409 to provide any of a plurality of spatial directivity patterns. Provided that certain conditions are met, including an adequate spatial distribution of physical microphones, any number of microphones 401, 402, 403, DMA elements 404, 405, 406, and amplifiers 407, 408, 409 can be linearly combined by the summer 410, to form spatial directivity patterns of arbitrary shapes and orientations.

Figure 5:
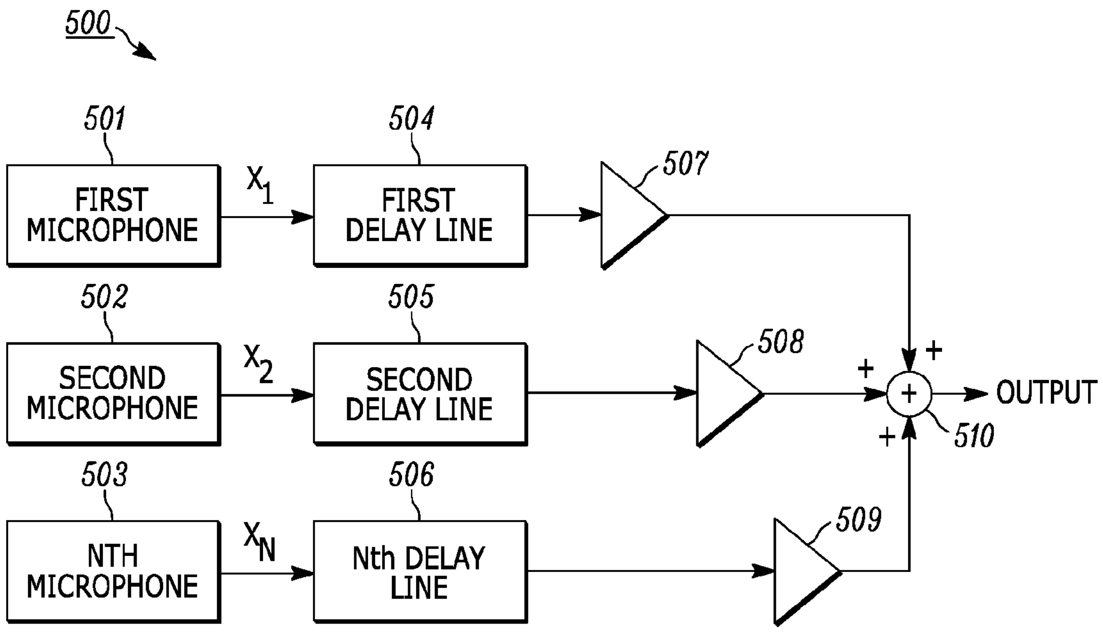
FIG. 5 PRIOR ART
FIG. 5 is a hardware block diagram of a prior art delay and sum beam former (DSB) microphone array.

FIG. 5 is a hardware block diagram of a prior art delay and sum beam former (DSB) microphone array 500. The array 500 includes a respective plurality of microphones, such as a first microphone 501, a second microphone 502, and an Nth microphone 503, that are configured for providing a corresponding plurality of output signals $X_1$, $X_2$, and $X_N$ in real time. The output signal $X_1$ from the first microphone 501 is fed to an input of a first delay line 504. Likewise, the output signal $X_2$ from the second microphone 502 is fed to an input of a second delay line 505. Similarly, the output signal $X_N$ from the Nth microphone 503 is fed to an input of an Nth delay line 506. An output of the first delay line 504 is fed to an input of a first amplifier 507, an output of the second delay line 505 is fed to an input of a second amplifier 508, and an output of the Nth delay line 506 is fed to an input of an Nth amplifier 509.

An output of the first amplifier 507 is fed to a first non-inverting input of a summer 510. An output of the second amplifier 508 is fed to a second non-inverting input of the summer 510. An output of the Nth amplifier 509 is fed to an Nth non-inverting input of the summer 510. An output from the summer 510 is regarded as the output of the array 500. The delays provided by the first, second, and Nth delay lines 504, 505, and 506 may each be adjusted, along with the gains provided by each of the first, second, and third amplifiers 507, 508, and 509 to provide any of a plurality of spatial directivity patterns. Provided that certain conditions are met, including an at least minimal spatial distribution of physical microphones, any number of microphones 501, 502, 503, delay lines 504, 505, 506, and amplifiers 507, 508, 509 can be linearly combined by the summer 510, to form spatial directivity patterns of arbitrary shapes and orientations.

According to a set of illustrative embodiments disclosed herein, methods are provided for steering a direction of convergence and maximum attenuation for an adaptive microphone array. For illustrative purposes, the adaptive microphone array may, but need not, be implemented using any of the systems described previously in connection with FIGS. 1-5. When operated using conventional approaches, the arrays of FIGS. 1-5 have the tendency to cancel a dominant or strongest-amplitude source of interference from a signal that is gathered by the array. However, there are situations when the strongest or most dominant source of interference is not the source of interference that needs to be cancelled or minimized. An example of this is an automatic speech recognition system which can be adversely affected to a much greater extent by the presence of another talker, than by the sound of a passing bus, even though the bus engine produces much louder noise. In such a case, the arrays of FIGS. 1-5 would tend to cancel the bus noise and let through the interfering talker noise.

The foregoing shortcomings and deficiencies may be addressed by providing methods and apparatuses for achieving cancellation or minimization of interference in a desired direction, to thereby provide a null along a desired angular bearing. Null steering is achieved by maintaining a mirrored adaptive microphone array for deriving an appropriate adaptive array configuration so as to achieve cancellation along a desired angular bearing or set of angular bearings for a real-time adaptive microphone array. The mirrored adaptive microphone array may be implemented using a second array of the same architecture and configuration as the real-time adaptive microphone array, or by using a single physical array to function both as a real-time array and as a mirror array.

Steering is achieved by adapting the configuration of the mirrored adaptive microphone array from a starting configuration, while operating on a specially recorded test or pilot signal. The function of the pilot or test signal is to force the adaptation to such a configuration which cancels (minimizes) this pilot. In multi-microphone arrays, the spatial properties of the pilot will be selected such as to steer the cancellation in that desired direction. Once an interfering source is localized and characterized, an appropriate configuration (or set of pilot signals) can be selected, in order to train the mirrored adaptive microphone array. The mirrored adaptive microphone array configuration is then used in the real-time adaptive microphone array, which operates on the real-time observations, in order to control where the cancellation occurs, without "contaminating" the real-time signal with that of the test, or pilot.

According to a set of illustrative embodiments, the real-time adaptive microphone array receives a signal subject to degradation from a source that is located in a look-up direction of the array. The degradation is modeled using a mirrored adaptive microphone array to process one or more test signals. The modeled degradation is used to derive an equalizer that is continuously or repeatedly adapted for removing, minimizing, or reducing the degradation. As indicated previously, the mirrored adaptive microphone array can be of the same architecture and configuration as the real-time adaptive microphone array. Alternatively or additionally, the same microphone array can be used to implement both the real-time adaptive microphone array and the mirrored adaptive microphone array.

The test or pilot signal processed by the mirrored adaptive microphone array is a signal recorded in free field (or near free field) conditions in an environment with minimal external noise and interference. These signals can also be simulated using a mathematical model. The test or pilot signal can be a broad-band noise, or a signal having similar spectral characteristics as that of the intended target. The test signal source is physically located in multiple directions with respect to the array, towards which steering may be necessary. Multiple directions with reference to the physical geometry of the microphone array, or with respect to the look-up direction of the mirrored adaptive microphone array, can be covered (in terms of steering in that particular orientation) using test or pilot signals recorded or simulated from sources located in these respective directions.

During operation, the real-time adaptive microphone array continuously or repeatedly changes its configuration, while reacting to the presence of interference in the environment. These configuration changes are then reflected in the mirrored adaptive microphone array by copying a set of configuration parameters from the real-time adaptive microphone array. These configuration parameters may include, for example, filter coefficients, filter gains, and other types of parameters. The mirrored adaptive array receives a signal from a control system, indicating whether or not, and in what direction, the array should converge. Next the mirror array retrieves the appropriate set of test or pilot signals and operates to derive a final set of steering weights, starting with the initial weight set or configuration obtained from the real time array. This final configuration is then send back to the real-time array.

Figure 6:
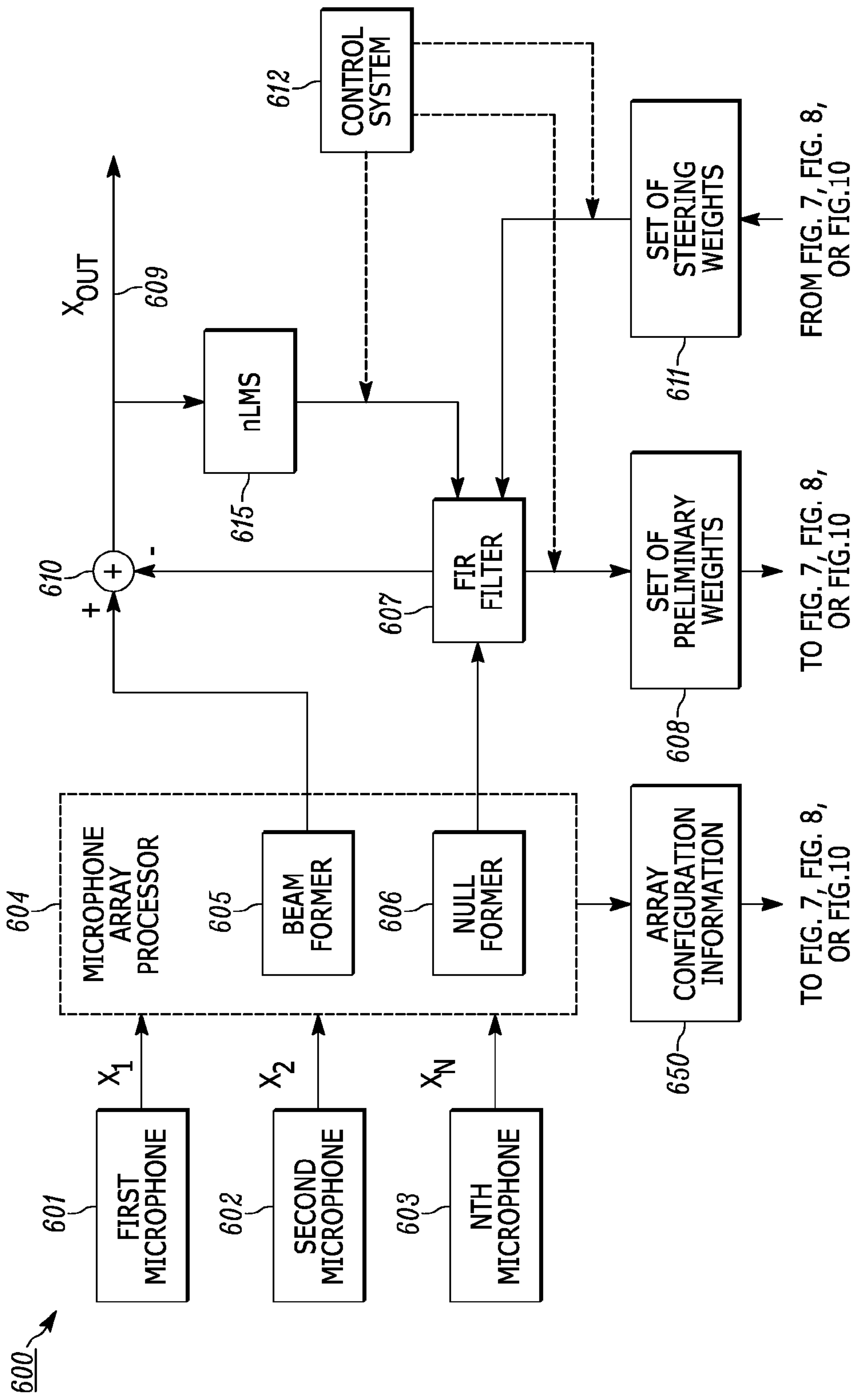
FIG. 6 is a hardware block diagram of a first illustrative real-time adaptive microphone array that provides a steerable direction of cancellation in accordance with a set of exemplary embodiments.
Figure 7:
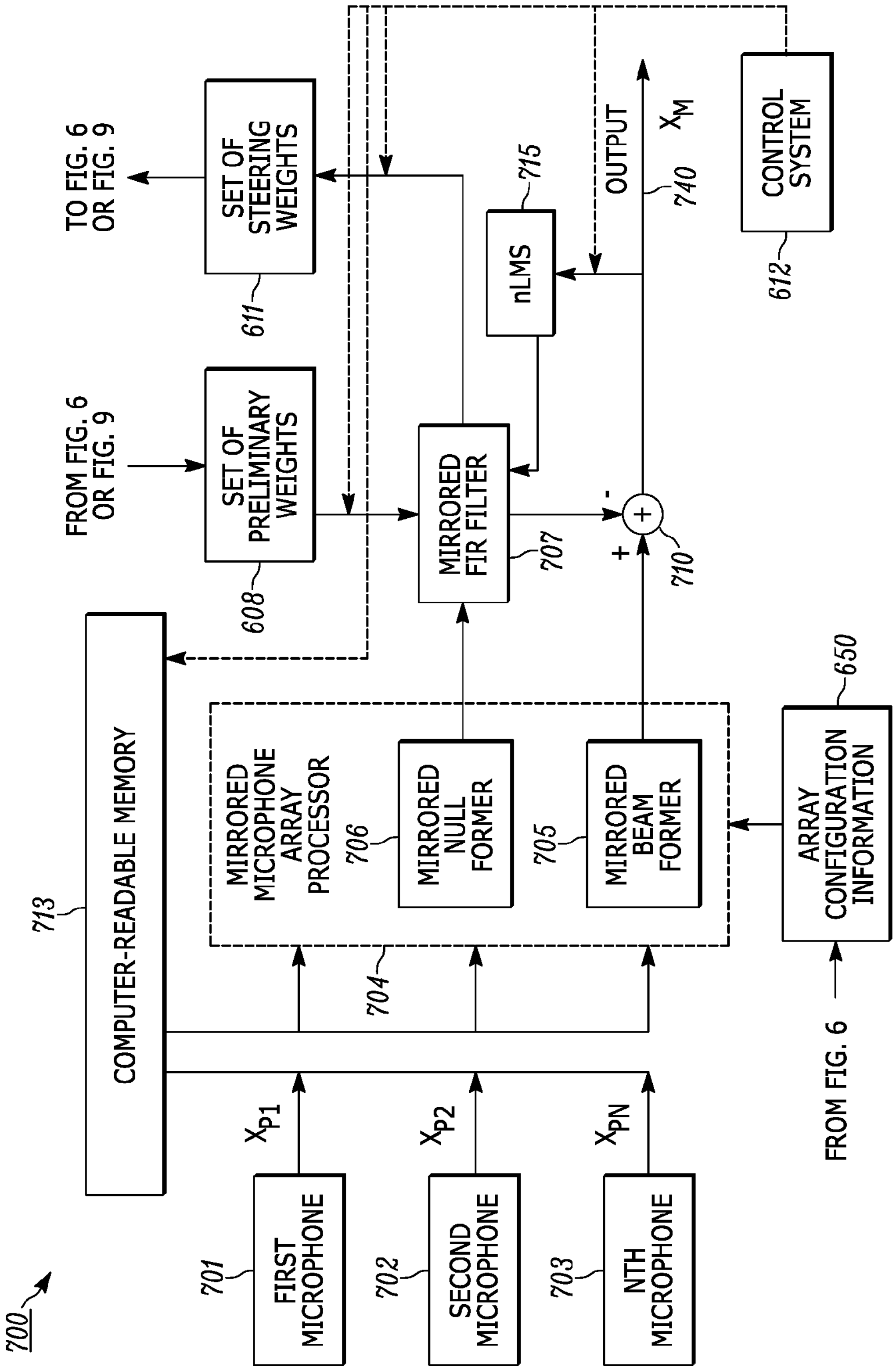
FIG. 7 is a hardware block diagram of a first illustrative mirrored adaptive microphone array that provides a steerable direction of cancellation in accordance with a set of exemplary embodiments.

Refer now to FIGS. 6 and 7 which together comprise a hardware block diagram of a first illustrative real-time adaptive equalization system for providing a steerable direction of cancellation in accordance with a set of exemplary embodiments. FIG. 6 shows a first illustrative real-time adaptive microphone array 600, and FIG. 7 shows a first illustrative mirrored adaptive microphone array 700. However, it should be understood that separate physical elements could, but need not, be used to implement the real-time adaptive microphone array 600 (FIG. 6) and the mirrored adaptive microphone array 700 (FIG. 7). Alternatively or additionally, some or all of the physical elements of the real-time adaptive microphone array 600 (FIG. 6) may be shared with corresponding physical elements of the mirrored adaptive microphone array 700 (FIG. 7).

The real-time adaptive microphone array 600 (FIG. 6) is configured for gathering signals from one or more desired directions in a main lobe of the array 600, and is also configured for reducing side interference gathered from one or more sources of acoustic energy that are not situated within the main lobe of the array 600. The array 600 includes a respective plurality of microphones, such as a first microphone 601, a second microphone 602, and an $N^{th}$ microphone 603, that are configured for gathering a corresponding plurality of signals $X_1$, $X_2$, and $X_N$ in real time.

The signals $X_1$, $X_2$, and $X_N$ gathered by the first, second, and Nth microphones 601, 602, and 603 are fed to a microphone array processor 604. The microphone array processor 604 includes a beam former 605 and a null former 606. The null former 606 may be regarded as a blocking matrix. The beam former 605 produces an output that contains a first set of signals comprising one or more signals from a desired target, and a second set of signals comprising undesired signals from interference sources. Thus, the beam former 605 provides an output comprising some combination of the multiple microphone signals from the first, second, and Nth microphones 601, 602, and 603, along with some interference. The null former 606 is configured to provide an output signal such that the first set of signals, representing signals from the desired source, are greatly attenuated. The output signal of the null former 606 primarily includes the second set of signals, representing the interference signals.

The output signal from the null former 606 is fed to an adaptive filter which, by way of example, may be a finite impulse response (FIR) filter 607. The FIR filter 607 is trained to remove the interference sources present and dominant in the output signal from the null former 606. The FIR filter 607 generates an adaptively filtered output signal by applying a set of weights to the output of the null former 606 and subtracting the result out of the output of the beam former 605. The weights of the FIR filter 607 are selected such as to minimize the presence of the second set of signals in the adaptively filtered output signal. The plurality of signals $X_1$, $X_2$, and $X_N$ are processed by the microphone array processor 604 and the FIR filter 607 to provide an output signal $X_E$ 609 and a set of preliminary weights 608.

The microphone array processor 604 includes the beam former 605 and the null former 606. The microphone array processor 604 may transmit array configuration information 650 to the mirrored adaptive microphone array 700 (FIG. 7). The null former 606 (FIG. 6) can include a matrix representing difference information between respective pairs of some or all of the plurality of microphones. The null former 606 is configured to orthogonalize space, such that signals from a desired source are blocked. The null former 606 can be realized by some combination of directional elements, so that a null is steered towards the frontal, look-up direction, or the direction in which the target/desired signal source is located. It is assumed herein that the desired source is situated at a particular orientation or set of orientations with reference to the real-time adaptive microphone array 600. Likewise, the null former 606 can be realized using a differential microphone element, or combination of such elements, intended to form an output signal which excludes signals from the desired source, such as the DMA element 308 of FIG. 3. The difference information produced by the differential microphone element includes a gradient that is indicative of a sensitivity of combination of signals of microphones 601, 602, and 603 (FIG. 6) towards an acoustic source situated in the main lobe. For explanatory purposes, each of the microphones 601, 602, and 603 may be considered to be omnidirectional elements, but this is not required, as the microphones may have any arbitrary directional pattern. The null former 606 can be implemented by using a set of differential microphone elements, and combinations of those, as illustrated in any of FIG. 3 or 4. The output of the null former 606 (FIG. 6) primarily includes undesired side interference outside of the main lobe of the array.

The beam former 605 provides a signal that is indicative of a sum or combination of the signals $X_1$, $X_2$, and $X_N$ gathered by the first, second, and $N^{th}$ microphones 601, 602, and 603, where this sum or combination primarily includes signals gathered from the main lobe of the array. The beam former 605 can be realized, either as a delayed sum of signals, as shown in FIG. 5, or as a combination of directional elements as shown in FIG. 4. The output of the null former 606 (FIG. 6) is operatively coupled to the finite impulse response (FIR) filter 607, and the output of the beam former 605 is operatively coupled to a non-inverting input of a summer 610.

For purposes of illustration, the FIR filter 607 may be configured to implement a procedure such as a normalized least mean squares (nLMS) 615 algorithm. The nLMS 615 algorithm represents a class of adaptive filter used to mimic a desired filter by determining a set of filter coefficients that produce a least mean square of an error signal. The error signal is the difference between a desired signal and an actual signal. The nLMS 615 algorithm may be conceptualized as a stochastic gradient descent method, in that the algorithm is adapted based on the error at the current moment in time.

The FIR filter 607 includes a delay line that is implemented using a set of memory elements. The FIR filter 607 exhibits an "impulse response" in the form of a set of FIR coefficients. If an impulse, such as a single "1" sample followed by many "0" samples, is fed to the input of the FIR filter 607, the output of the filter will be a set of coefficients where the "1" sample sequentially moves past each coefficient in turn to form the output of the FIR filter 607. In the example of FIG. 6, an output of the FIR filter 607 represents the set of preliminary weights 608.

Illustratively, the FIR filter 607 could, but need not, be implemented using a digital signal processor (DSP) microprocessor that is configured for executing one or more looped instructions. The FIR filter 607 may be configured for performing multi-rate applications such as decimation (reducing the sampling rate), interpolation (increasing the sampling rate), or both. One or more taps may be provided by the FIR filter 607 where each tap represents a coefficient/delay pair. The number of FIR taps may be selected in accordance with a desired amount of filtering to be performed by the FIR filter 607. Using a greater number of taps provides a more accurate representation of the transfer function that the FIR filter 607 is modeling/tracking.

The output of the FIR filter 607 is provided to an inverting input of the summer 610. A non-inverting output of the summer 610 represents the output signal $X_E$ 609. The output signal $X_E$ 609 includes signals gathered from the main lobe of the array 600, with substantially little or no interference from sources of acoustic energy that are situated outside of the main lobe. However, it may be noted that temporal and spatial information included in the signals $X_1$, $X_2$, and $X_N$ collected by the array 600 are estimated using array signal processing and adaptation procedures to formulate a filter transfer function for the FIR filter 607 of the array 600. These array signal processing and adaptation procedures may have the undesirable property of degrading signals of interest in the main lobe of the array 600. This degradation is caused by speech leakage affecting the adaptation procedure executed by the array 600, as well as artifacts caused by the filter transfer function. A set of null steering weights 611 is received from a mirrored adaptive microphone array 700 (FIG. 7). The set of null steering weights 611 is applied to the FIR filter 607 such that the amplitude response of the output signal $X_E$ 609 is minimized in the direction of the null.

A control system 612 may be used to identify whether or not a steerable direction of cancellation is to be provided. If so, the control system 612 determines one or more directions to which cancellation is to be steered. As a result, one or more real-time adaptive microphone array 600 changes are then reflected in the mirrored adaptive microphone array 700 (FIG. 7) by copying the real-time array configuration parameters 650 from the real-time adaptive microphone array 600 to the mirrored adaptive microphone array 700. These real-time array configuration parameters may illustratively include filter coefficients and filter gains.

The control system 612 (FIGS. 6 and 7) may comprise a processing mechanism, such as a microprocessor, microcontroller, or computer, that is operatively coupled to the real-time adaptive microphone array 600 (FIG. 6) and to the mirrored adaptive microphone array 700 (FIG. 7). The control system 612 (FIGS. 6 and 7) identifies which out of set of test signals are appropriate to steer cancellation to the specific angular direction. The mirrored adaptive microphone array 700 (FIG. 7) is then able to continuously cancel the test or pilot-dominated signal by processing this prerecorded test signal. The mirrored adaptive microphone array 700 therefore provides a configuration back to the real-time adaptive microphone array 600 (FIG. 6), therefore steering the cancellation in the desired direction.

The control system 612 (FIGS. 6 and 7) may be programmed to implement any of various functions in the context of voice communications over a wireless handset or mobile phone. At the beginning of a call, the null can be steered to a specific direction (for example, in a direction near that of the intended desired signal). The control system 612 can "scan" the surroundings and identify the locations of one or more strong interfering sources. The control system 612 can then classify these interfering sources and make a decision as to whether or not controlled steering action is needed, or if the adaptive array steering mechanism will work adequately well without performing any null steering. A criterion for reaching this decision could be presence of "strong" broad-band interference, versus "weak" babble noise interference. The control system 612 may also be configured to utilize a feed-back mechanism which steers cancellation and determines when automatic speech recognition is maximized.

The control system 612 may be configured to use additional measures of quality of the de-noised signal, and presence/absence, or degree of cancellation of babble noise interference sources in it, in order to make a decision as to whether or not null steering will be implemented. In some embodiments, the control system 612 can use visual identification, from a camera or imaging device, to detect and characterize potential sources of interference in the field of view. For example, other nearby talkers can be identified, and their location calculated in order to make a steering decision.

Refer now to FIG. 7 which illustrates the mirrored adaptive microphone array 700. The mirrored adaptive microphone array 700 is used to provide cancellation or minimization of interference in a desired direction, to thereby provide a null along a desired angular bearing for the real-time adaptive microphone array 600 (FIG. 6). The mirrored adaptive microphone array 700 adapts to a new configuration which provides enhanced or maximized cancellation in the desired direction based on a recorded test signal or pilot signal. The recorded test signal or pilot signal is retrieved from a computer-readable memory. Null steering is achieved by using the mirrored adaptive microphone array 700 (FIG. 7) to derive an appropriate adaptive array configuration so as to achieve cancellation in the desired direction along a desired angular bearing or set of angular bearings. The mirrored adaptive microphone array 700 may be implemented using a second array of the same architecture and configuration as the real-time adaptive microphone array 600 (FIG. 6), or by using the same physical array to function both as the real-time adaptive microphone array 600 and as the mirrored adaptive microphone array 700 (FIG. 7).

Steering is achieved by adapting the configuration of the mirrored adaptive microphone array 700 from a starting configuration, while operating on the recorded test signal or pilot signal. The test signal or pilot signal is selected by the control system 612 (FIGS. 6 and 7). The function of the pilot or test signal is to force the adaptation to such a configuration which cancels (minimizes) this pilot. In multi-microphone arrays, the spatial origin of the pilot will be selected such as to steer the cancellation in that desired direction. Once an interfering source is localized and characterized, an appropriate configuration (or set of pilot signals) can be selected, in order to train the mirror system. The mirror system configuration is then used in the real-time adaptive microphone array 600 (FIG. 6), which operates on the real-time observations, in order to control where the cancellation occurs, without "contaminating" the real-time signal with that of the test signal or pilot signal.

According to a set of illustrative embodiments, the real-time adaptive microphone array 600 (FIG. 6) may need to be steered in a direction determined by the control system. The steering is achieved by the mirrored adaptive microphone array 700 (FIG. 7) processing one or more test or pilot signals. The final steering configuration is then used by the array 600. As indicated previously, the mirrored adaptive microphone array 700 can be of the same architecture and configuration as the real-time adaptive microphone array 600 (FIG. 6). Alternatively or additionally, the same microphone array can be used to implement both the real-time adaptive microphone array 600 and the mirrored adaptive microphone array 700 (FIG. 7).

The test (or pilot) signals processed by the mirrored adaptive microphone array 700 are signals recorded in free field (or near free field) conditions in an environment with minimal external noise and interference, or are obtained using a mathematical model. The test signals can be broadband noise, or signals having similar spectral characteristics relative to that of the intended target. The test signal sources are physically located in various directions with respect to the array, where steering is potentially required. Multiple directions with reference to the physical geometry of the microphone array, or with respect to the look-up direction of the mirrored adaptive microphone array, can be covered (in terms of steering the array in that particular orientation) using test signals recorded from sources located in these respective directions.

During operation, the real-time adaptive microphone array 600 (FIG. 6) continuously or repeatedly changes its configuration, as reflected by the array configuration information 650 (FIGS. 6 and 7), while reacting to the presence of interference in the environment. These configuration changes are then reflected in the mirrored adaptive microphone array 700 (FIG. 7) by copying this array configuration information 650 from the real-time adaptive microphone array 600 (FIG. 6). This array configuration information 650 may be copied in real time. Alternatively or additionally, the array configuration information 650 may be stored in a computer-readable memory at the real-time adaptive microphone array 600 (FIG. 6) or the mirrored adaptive microphone array 700 (FIG. 7) for subsequent retrieval. Alternatively or additionally, the array configuration information 650 may be sent to the mirrored adaptive microphone array 700 on a sample-by-sample or frame-by-frame basis. The real-time adaptive microphone array 600 (FIG. 6) may continue sending the array configuration information 650 to the mirrored adaptive microphone array 700 (FIG. 7) until the control system 612 (FIGS. 6 and 7) turns off or disables the sending. As previously mentioned, the array configuration information 650 may include, for example, filter coefficients, filter gains, and other types of parameters.

The mirrored adaptive microphone array 700 (FIG. 7) when directed by the control system then continuously or repeatedly calculates new steering parameters by processing the pre-recorded test signals. The mirrored adaptive microphone array 700 provides configuration information which is used to steer the direction of cancellation of the real-time adaptive microphone array 600 (FIG. 6), thus overcoming the problem of the real time array cancelling an otherwise less important interference source. The steering configuration changes continuously or repeatedly, following the adaptation of the real-time adaptive microphone array 600 (FIG. 6). In circumstances where an initial set of preliminary weights 608 are to be used, the mirrored adaptive microphone array 700 (FIG. 7) may operate exactly like the real-time adaptive microphone array 600 (FIG. 6).

As mentioned previously, it should be understood that separate physical elements could, but need not, be used to implement the real-time adaptive microphone array 600 (FIG. 6) and the mirrored adaptive microphone array 700 (FIG. 7). Alternatively or additionally, some or all of the physical elements of the real-time adaptive microphone array 600 (FIG. 6) may be shared with corresponding physical elements of the mirrored adaptive microphone array 700 (FIG. 7).

The mirrored adaptive microphone array 700 mirrors the real-time adaptive microphone array 600 (FIG. 6), but the mirrored adaptive microphone array 700 operates on one or more test or pilot signals instead of signals that are gathered in real time. The one or more test or pilot signals are obtained using a desired source that is situated in a substantially free-field environment, free of acoustic reflections, interference, and noise, or from a mathematical model.

For example, the one or more test signals may be obtained by using a point source (such as an artificial mouth, artificial larynx, loudspeaker, function generator, oscillator, or other source) producing acoustic energy in the form of white noise, pink noise, a test signal having a spectral content similar or identical to that of a desired target signal, a multi-tone signal, a pseudo-speech signal, or any of various combinations thereof. The one or more test signals are recorded and stored in a computer readable memory device. For example, the test signals may be recorded, as described, using the mirrored adaptive microphone array 700 (FIG. 7), or the real-time adaptive microphone array 600 (FIG. 6), or an adaptive microphone array that is representative of the real-time adaptive microphone array 600, or may also be a result of simulation using a mathematical model to calculate appropriate filter equalization parameters for the FIR filter 607. The recording of the test signals may be performed in free (or near free) field conditions, in the absence of noise and interference. The test signals can be recorded using the microphones 601, 602, and 603 (FIG. 6) of the real-time adaptive microphone array 600, or using the microphones 701, 702, and 703 of the mirrored adaptive microphone array 700 (FIG. 7). Alternatively or additionally, the test signals can obtained using a test fixture in the form of an external test microphone, a test loudspeaker, or a test microphone feeding a test loudspeaker via an audio amplifier, to produce acoustic energy, while all microphone signals from the mirrored adaptive microphone array 700 are recorded simultaneously for a given bearing or direction of interest of the array 700 relative to the test fixture.

The mirrored adaptive microphone array 700 (FIG. 7) is configured for storing outputs of the mirrored adaptive microphone array that were gathered using test signals received by the array at one or more angular bearings with respect to the array. The array 700 includes a respective plurality of microphones, such as a first microphone 701, a second microphone 702, and an $N^{th}$ microphone 703, that are configured for gathering a corresponding plurality of signals $X_{P1}$, $X_{P2}$, and $X_{PN}$ in a test environment and storing them in a computer-readable memory 713 for use during real-time operation during normal use of the real-time adaptive microphone array 600 (FIG. 6). The plurality of signals $X_{P1}$, $X_{P2}$, and $X_{PN}$, as retrieved from the computer-readable memory 713 and the set of preliminary weights 608 (FIGS. 6 and 7) are then processed by the array 700 (FIG. 7) to provide the set of null steering weights 611 for the real-time adaptive microphone array 600 of FIG. 6.

The computer-readable memory 713 (FIG. 7) is configured for storing the outputs of the mirrored adaptive microphone array that were gathered using test signals received by the array at one or more angular bearings with respect to the array. The test signals are gathered by a set of microphones which, in the present example, include the first microphone 701, the second microphone 702, and the $N^{th}$ microphone 703. However, two different sets of microphones need not be used for the mirrored adaptive microphone array 700 and the real-time adaptive microphone array 600 (FIG. 6). For example, the first microphone 701 may be implemented using the first microphone 601 (FIG. 6), the second microphone 702 (FIG. 7) may be implemented using the second microphone 602 (FIG. 6), and the Nth microphone 703 (FIG. 7) may be implemented using the Nth microphone 603 (FIG. 6). Alternatively or additionally, the mirrored adaptive microphone array 700 (FIG. 7) may include a set of microphones 701, 702 and 703 that are provided in the form of a single test array for use with a plurality of real-time adaptive microphone arrays 600 (FIG. 6), wherein the single test array is a representative sample for a set of real-time adaptive microphone arrays 600 produced in a production environment.

The set of null steering weights 611 (FIGS. 6 and 7) may be provided, for example, by applying the plurality of signals $X_{P1}$, $X_{P2}$, and $X_{PN}$ to a mirrored beam former 705 and a mirrored null former 706. Alternatively, the mirrored adaptive microphone array 700 may utilize the beam former 605 and null former 606 of FIG. 6. The mirrored beam former 705 and the mirrored null former 706 may be provided in the form of a mirrored microphone array processor 704. The mirrored beam former 705 (FIG. 7) provides a signal that is indicative of a sum or combination of the signals $X_1$, $X_2$, and $X_N$ gathered by the first, second, and $N^{th}$ microphones 701, 702, and 703, where this sum or combination primarily includes signals gathered from the main lobe of the array. The output of the mirrored null former 706 is operatively coupled to a mirrored finite impulse response (FIR) filter 707, and the beam former 705 is operatively coupled to a non-inverting input of a summer 710. Alternatively, the mirrored adaptive microphone array 700 may utilize the FIR filter 607 and the summer 610 of FIG. 6.

The mirrored FIR filter 707 (FIG. 7) may include a delay line that is implemented using a set of memory elements. The mirrored FIR filter 707 exhibits an "impulse response" in the form of a set of FIR coefficients. If an impulse, such as a single "1" sample followed by many "0" samples, is fed to the input of the mirrored FIR filter 707, the output of the filter will be a set of coefficients where the "1" sample sequentially moves past each coefficient in turn to form the output of the mirrored FIR filter 707. Illustratively, the mirrored FIR filter 707 could, but need not, be implemented using a digital signal processor (DSP) microprocessor that is configured for executing one or more looped instructions. Illustratively, the mirrored FIR filter 707 could be implemented using the FIR filter 607 of FIG. 6.

The output of the mirrored FIR filter 707 (FIG. 7) is provided to an inverting input of the summer 710. The output of the mirrored null former 706 is provided to the input of the mirrored FIR filter 707. The output of the mirrored beam former 705 is provided to a non-inverting input of the summer 710. A non-inverting output of the summer 710 comprises an output $X_M$ 740 of the mirrored adaptive microphone array 700.

The mirrored FIR filter 707 produces the set of null steering weights 611 (FIGS. 6 and 7) based upon selecting and retrieving gathered test or pilot signals from the computer-readable memory 713 (FIG. 7) corresponding to one or more angular bearings for which the amplitude response of the real-time adaptive microphone array 600 (FIG. 6) is to be minimized or reduced. Thus, the mirrored adaptive microphone array 700 (FIG. 7) determines optimized or appropriate null steering weights 611 in view of one or more recorded test signals that were obtained with one or more of the microphones 701, 702, 703 under idealized test conditions. Once the optimal filter weights are obtained, they are used to filter the output $X_{OUT}$ 609 of the real-time adaptive microphone array 600 (FIG. 6).

The microphone array processor 604 of the real-time adaptive microphone array 600 may contain time-adapting elements (e.g., an adaptive filter) whose operation is reflected in the mirrored microphone array processor 704 of the mirrored adaptive microphone array 700 (FIG. 7), in response to array configuration information 650 being sent from the real-time adaptive microphone array 600 (FIG. 6) to the mirrored adaptive microphone array 700 (FIG. 7). The array configuration information 650 may include one or more microphone configuration parameters, such as a set of time delay values, phases, and gains applied to each microphone in the array. In some embodiments, use of adaptive microphone arrays may not be required. In such cases, an alternative embodiment as shown in FIG. 8 may be employed.

Figure 8:
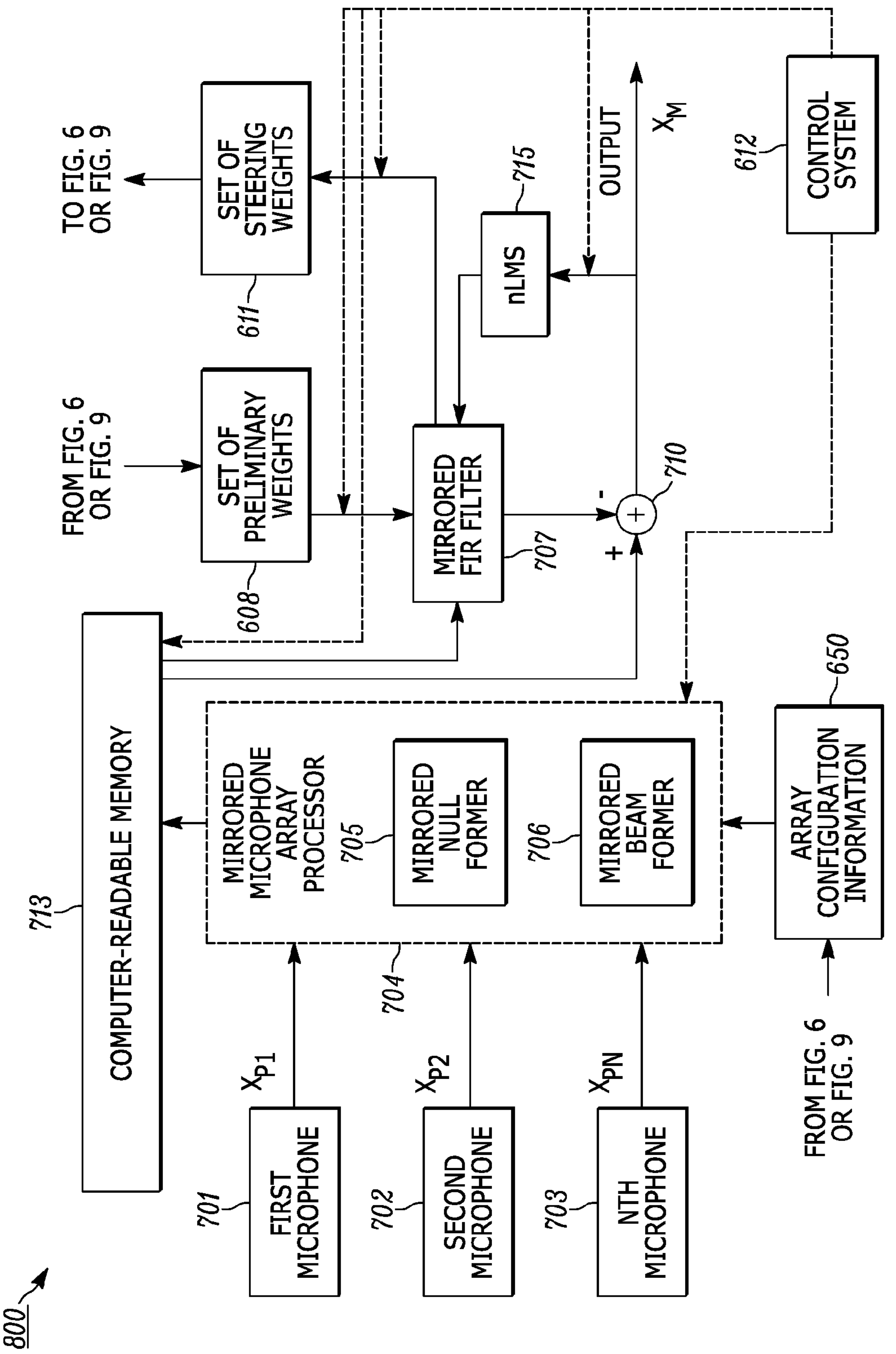
FIG. 8 is a hardware block diagram of a second illustrative mirrored microphone array that provides a steerable direction of cancellation in accordance with another set of exemplary embodiments.

FIG. 8 is a hardware block diagram of a second illustrative mirrored microphone array 800 for providing a steerable direction of cancellation in accordance with another set of exemplary embodiments. For example, the mirrored microphone array 800 may, but need not, be employed as an alternative or in addition to the mirrored adaptive microphone array of FIG. 7. To facilitate understanding, identical reference numerals have been used in FIGS. 7 and 8, wherever possible, to designate identical elements that are common to these figures. The set of embodiments depicted in FIG. 8 can be used in cases where the microphone array processor 604 of the microphone array 600 does not include any time-varying elements. Thus, the output of the mirrored microphone array 800 can be stored in the computer readable memory 713 (FIG. 8) and used together with the set of preliminary weights 608.

In this embodiment, the real-time adaptive microphone array 600 (FIG. 6) produces the set of preliminary weights 608 (FIGS. 6 and 8), while the mirrored microphone array 800 (FIG. 8) will only be needed during the set-up/tuning phase, in order to configure the mirrored microphone array 800, and to produce and store a set of outputs in the computer readable memory 713, for one or more directions in which cancellation is desired. This set of outputs (rather than the recordings of the set of microphones in the mirrored microphone array 800 of FIG. 8) are stored in the computer-readable memory 713 (FIG. 8) and used together with the set of preliminary weights 608. This approach provides some benefits in terms of reducing computational overhead and storage requirements. During real-time operation, modeling of the degradation of the desired source is achieved by providing the output of the mirrored null former 706 (FIG. 8) from the computer-readable memory 713 into the input of the mirrored FIR filter 707. The output from the mirrored beam-former 705, stored in the computer memory is provided to a non-inverting input of a summation block 710. The output of the mirrored filter 707 is used to provide the set of steering weights 611.

It should be noted that several differences can be appreciated between the embodiments of FIGS. 7 and 8. More particularly, it should be appreciated that, in embodiments in which the beam-former/null-former can be time-varying, then the structures shown in FIG. 7 are appropriate. Alternatively, if there are no time varying elements in the microphone array processor 604, then FIG. 8 is representing a system that is computationally more efficient (e.g., in terms of how the outputs of the microphone array processor 604 of the array 600 are stored, rather than calculated), and fewer signals are stored (e.g., two, as opposed to many microphone signals for each direction of interest).

Figure 9:
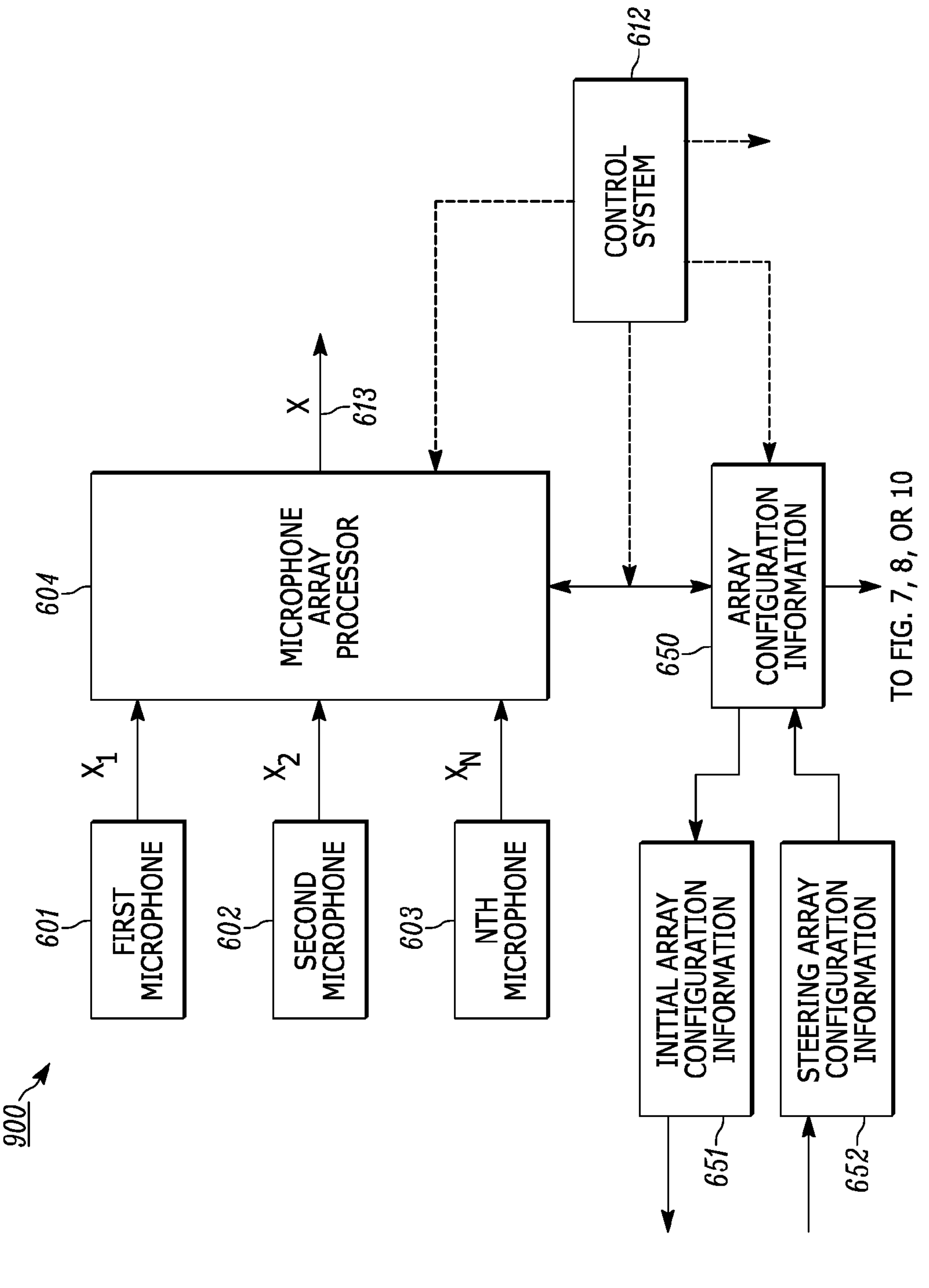
FIG. 9 is a hardware block diagram illustrating a second real-time adaptive microphone array that provides a steerable direction of cancellation in accordance with another set of exemplary embodiments.

FIG. 9 is a hardware block diagram illustrating a second real-time adaptive microphone array 900 for providing a steerable direction of cancellation in accordance with another set of exemplary embodiments. To facilitate understanding, identical reference numerals have been used in FIGS. 6 and 9, wherever possible, to designate identical elements that are common to these figures. Any of a variety of adaptive microphone systems may be employed to implement the real-time adaptive microphone array 900, so long as their operation can be mirrored in order derive a new set of steering configuration, based on a control signal, a set of starting weights, and a database of test or pilot signals. The array configuration information 650 of FIG. 9 includes initial array configuration information 651 as well as steering array configuration information 652. A control system 612 (FIG. 9) determines the test signals that are to be used, and whether or not an initial set of steering weights are to be used. The control system 612 also determines whether or not a new set of steering weights are to be calculated and sent back to the real-time adaptive microphone array 600 (FIG. 6). The control system 612 (FIG. 9) may also determine when adaptation of the microphone array processor 604 starts and stops.

Figure 10:
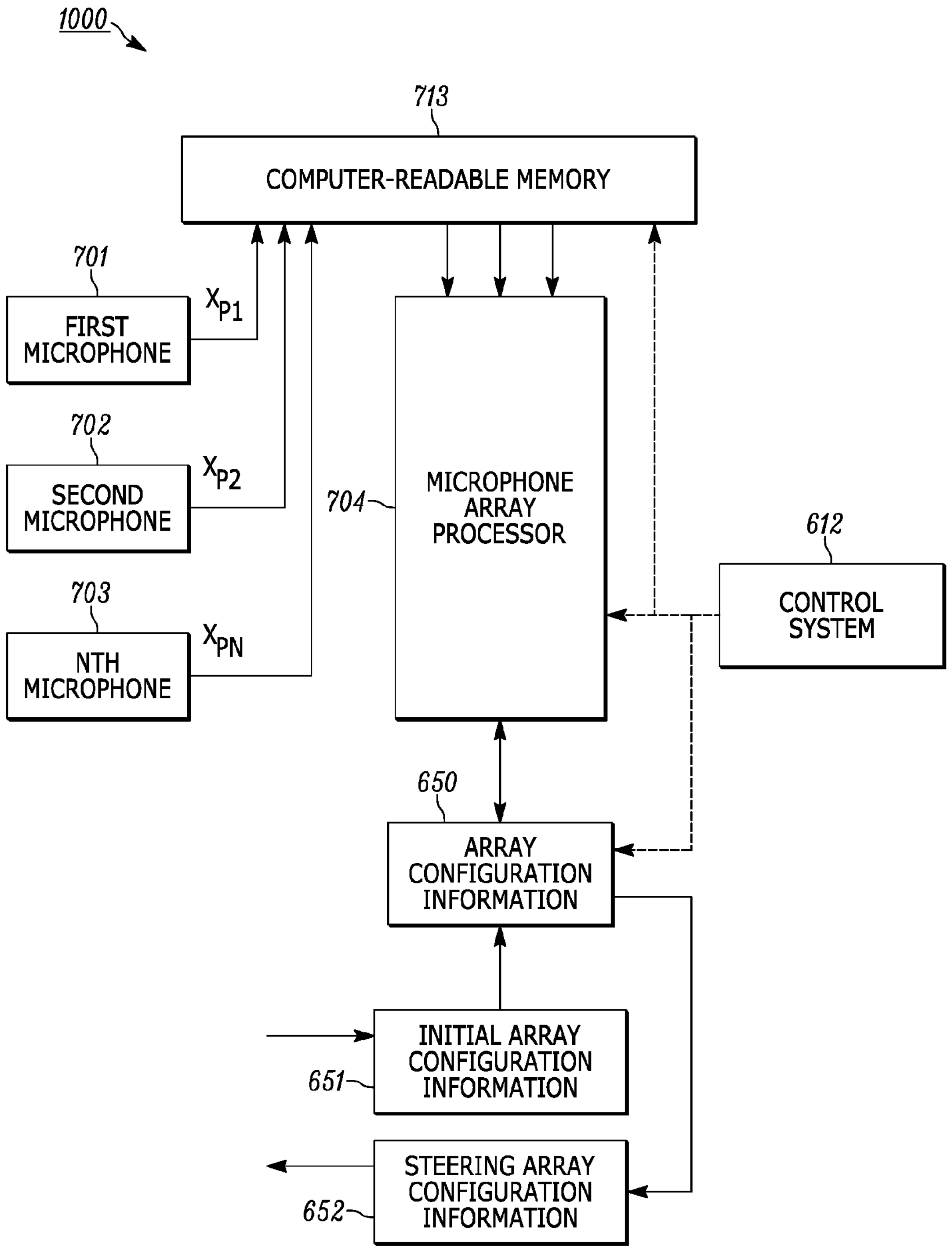
FIG. 10 is a hardware block diagram illustrating a third mirrored adaptive microphone array that provides a steerable direction of cancellation in accordance with another set of exemplary embodiments.

FIG. 10 is a hardware block diagram illustrating a third mirrored adaptive microphone array 1000 constructed in accordance with another set of exemplary embodiments. It may be recognized that common blocks and elements can be used to construct the configuration of FIG. 10. To facilitate understanding, identical reference numerals have been used in FIGS. 7 and 10, wherever possible, to designate identical elements that are common to these figures. It should be understood that the mirrored adaptive microphone array 1000 of FIG. 10 may be employed in conjunction with any of the real-time adaptive microphone arrays shown in FIGS. 6 and 9. Moreover, it should be understood that any of the real-time adaptive microphone arrays of FIGS. 6 and 9 may be implemented using the same set of physical elements or programming functions as any of the mirrored adaptive microphone arrays of FIGS. 7, 8, and 10.

The mirrored adaptive microphone array 1000 of FIG. 10 acts on inputs from the first, second, and Nth microphones 701, 702, and 703. The outputs of the first, second, and Nth microphones 701, 702, and 703 (FIG. 10) are stored in the computer-readable memory 713. A mirrored microphone array processor 704 (FIG. 10) accepts the array configuration information 650 from any of the real-time adaptive microphone arrays of FIG. 6 or 9. The mirrored adaptive microphone array processor 704 (FIG. 10) retrieves the stored outputs of the first, second, and Nth microphones 701, 702, and 703 from the computer-readable memory 713 and uses the retrieved outputs and information from the control system to a derive a set of final steering configuration(s) to be used to direct the operation of the real time array.

Figure 11:
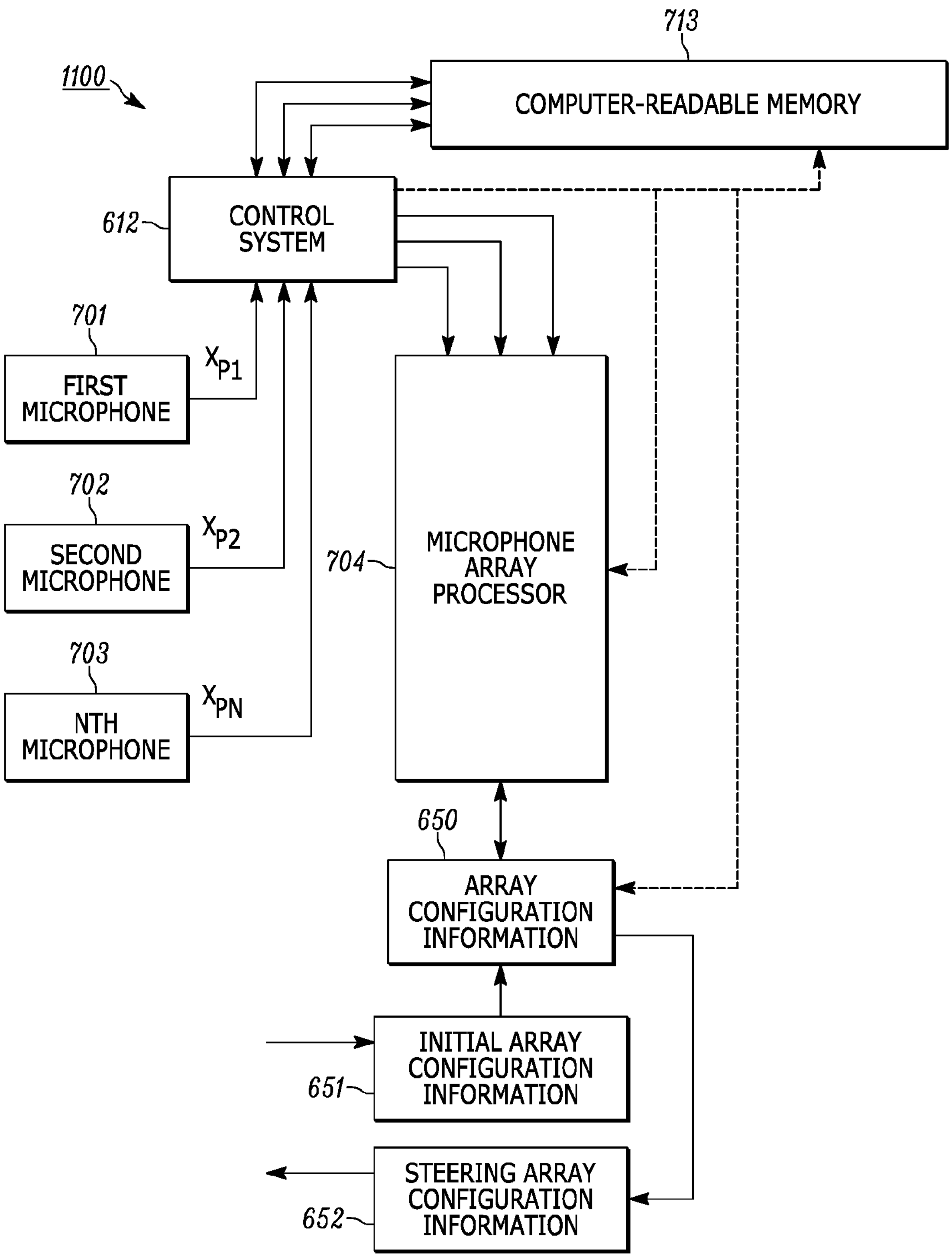
FIG. 11 is a hardware block diagram illustrating a fourth mirrored adaptive microphone array that provides a steerable direction of cancellation in accordance with another set of exemplary embodiments.

FIG. 11 is a hardware block diagram illustrating a fourth mirrored adaptive microphone array that provides a steerable direction of cancellation in accordance with another set of exemplary embodiments. The control system 612 (FIGS. 6, 7, and 11) is configured to control transfer of signals between the computer-readable memory 612, the mirrored microphone array processor 704 (FIGS. 7 and 11), and the first, second, and Nth microphones 701, 702, 703, as well as to determine, when the mirrored array is configured with an initial set of steering weights, the direction of the final steering configuration that is derived, prior to sending this final configuration to the real time array.

It should be recognized that the foregoing systems of FIGS. 6-11 are applicable to solving the general problem of steering the spatial direction of convergence of an adaptive microphone array in applications that utilize multi-sensor spatial processing. However, the systems of FIGS. 6-11 have application in areas other than microphone arrays, and include hydro-acoustics/sonar, radio, smart antennas, radar and others. In these cases, naturally, the appropriate test signals and environments will be used to collect the information needed for the operation of the respective mirrored systems. Furthermore, all adaptive array systems tend to rely on additional supporting mechanisms, which may be helpful to the optimal operation of the array. One such mechanism is voice activity detection (VAD). VAD is often useful for the adaptive microphone array in order to detect the presence of desired talker activity and slow down, or even freeze, the adaptation of the system. This is done in order to minimize audible artifacts introduced in the desired talker's speech by the FIR filter 607, 707 (FIGS. 6 and 7) continuously changing weights. Another detail is placement of delays in the signal path, where appropriate, to ensure causality of the adaptive system.

Although some of the foregoing embodiments discussed herein illustrate use of FIR filters 607, 707 (FIGS. 6 and 7) in the adaptive system, this is for illustrative purposes only. Adaptation using recursive filters, as well as adaptation in the frequency domain, can be used in addition to, or in lieu of, an FIR approach. Other details of implementation include the size of the FIR filter 607, 707 (when an FIR mechanism is used). Forming the constituent elements of the microphone arrays can be performed using any combination of time delay (including fractional), time domain FIR or infinite impulse response (IIR), as well as frequency domain filtering and processing. The choice of one approach versus the other is based on factors such as available code base, other processing that is already being performed by the system, computational costs, current drain costs, development costs and time schedules, and other considerations.

Figure 12:
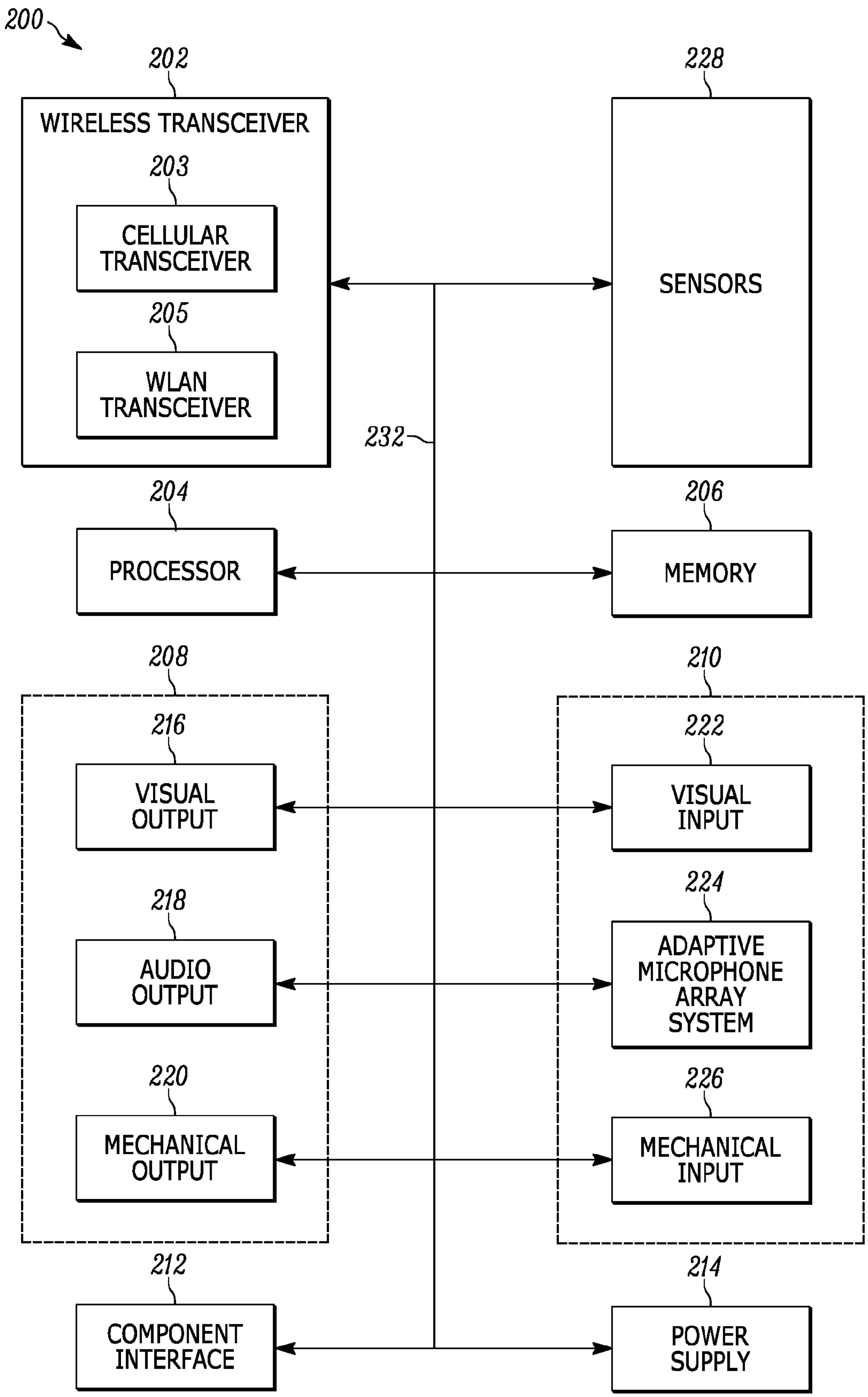
FIG. 12 is a hardware block diagram showing an illustrative mobile device for performing null steering for an adaptive microphone array in accordance with a set of exemplary embodiments.

FIG. 12 is a hardware block diagram showing an illustrative mobile device 200 for performing null steering for an adaptive microphone array in accordance with a set of exemplary embodiments. The mobile device 200 is representative of any communication device that is operated by persons (or users) or possibly by other entities (e.g., other computers) desiring or requiring communication capabilities. In some embodiments, for example, the mobile device 200 may be any of a smartphone, a cellular telephone, a personal digital assistants (PDA), another type of handheld or portable electronic device, a headset, an MP3 player, a battery-powered device, a wearable device, a wristwatch, a radio, a navigation device, a laptop or notebook computer, a netbook, a pager, a PMP (personal media player), a DVR (digital video recorder), a gaming device, a game interface, a camera, an e-reader, an e-book, a tablet device, a navigation device with a video-capable screen, a multimedia docking stations, or another type of electronic mobile device.

As shown in FIG. 12, an illustrative mobile device 200 includes one or more wireless transceivers 202, a processor 204 (e.g., a microprocessor, microcomputer, application-specific integrated circuit, etc.), a memory 206, one or more output devices 208, and one or more input devices 210. In at least some embodiments, a user interface is present that comprises one or more output devices 208, such as a display, and one or more input devices 210, such as a keypad or touch sensor. The mobile device 200 can further include a component interface 212 to provide a direct connection to auxiliary components or accessories for additional or enhanced functionality. The mobile device 200 preferably also includes a power supply 214, such as a battery, for providing power to the other internal components while enabling the mobile device to be portable. Some or all of the components of the mobile device 200 can be coupled to one another, and in communication with one another, by way of one or more internal communication links 232 (e.g., an internal bus).

In the present embodiment of FIG. 12, the wireless transceivers 202 particularly include a cellular transceiver 203 and a wireless local area network (WLAN) transceiver 205. More particularly, the cellular transceiver 203 is configured to conduct cellular communications, such as 3G, 4G, 4G-LTE, etc., vis-à-vis cell towers (not shown), albeit in other embodiments, the cellular transceiver 203 can be configured instead or additionally to utilize any of a variety of other cellular-based communication technologies such as analog communications (using AMPS), digital communications (using CDMA, TDMA, GSM, iDEN, GPRS, EDGE, etc.), and/or next generation communications (using UMTS, WCDMA, LTE, IEEE 802.16, etc.) or variants thereof.

The WLAN transceiver 205 may, but need not, be configured to conduct Wi-Fi communications in accordance with the IEEE 802.11 (a, b, g, or n) standard with access points. In other embodiments, the WLAN transceiver 205 can instead (or in addition) conduct other types of communications commonly understood as being encompassed within Wi-Fi communications such as some types of peer-to-peer (e.g., Wi-Fi Peer-to-Peer) communications. Further, in other embodiments, the WLAN transceiver 205 can be replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology. Thus, although in the present embodiment the mobile device 108 has two of the wireless transceivers 203 and 205, the present disclosure is intended to encompass numerous embodiments in which any arbitrary number of (e.g., more than two) wireless transceivers employing any arbitrary number of (e.g., two or more) communication technologies are present.

Exemplary operation of the wireless transceivers 202 in conjunction with others of the internal components of the mobile device 200 can take a variety of forms and can include, for example, operation in which, upon reception of wireless signals, the internal components detect communication signals and one or more of the wireless transceivers 202 demodulate the communication signals to recover incoming information, such as voice and/or data, transmitted by the wireless signals. After receiving the incoming information from one or more of the wireless transceivers 202, the processor 204 formats the incoming information for the one or more output devices 208. Likewise, for transmission of wireless signals, the processor 204 formats outgoing information, which may or may not be activated by the input devices 210, and conveys the outgoing information to one or more of the wireless transceivers 202 for modulation to communication signals. The wireless transceivers 202 convey the modulated signals by way of wireless and (possibly wired as well) communication links to other devices such as a server and possibly one or more content provider websites (as well as possibly to other devices such as a cell tower, access point, or another server or any of a variety of remote devices).

Depending upon the embodiment, the mobile device 200 may be equipped with one or more input devices 210, or one or more output devices 208, or any of various combinations of input devices 210 and output devices 208. The input and output devices 208, 210 can include a variety of visual, audio and/or mechanical outputs. For example, the output device(s) 208 can include one or more visual output devices 216 such as a liquid crystal display and light emitting diode indicator, one or more audio output devices 218 such as a speaker, alarm and/or buzzer, and/or one or more mechanical output devices 220 such as a vibrating mechanism. The visual output devices 216 can include, among other things, a video screen.

The input devices 210 (FIG. 12) include one or more audio input devices such as an adaptive microphone array system 224. The adaptive microphone array system 224 includes the real-time adaptive microphone array 600 of FIG. 6 and the mirrored real-time adaptive microphone array 700 of FIG. 7. In practice, note that the same set of physical devices may, but need not, be used to implement both the real-time adaptive microphone array 600 (FIG. 6) and the mirrored adaptive microphone array 700 (FIG. 7).

Likewise, by example, the input devices 210 (FIG. 12) may, but need not, include one or more sensors 228, or one or more mechanical input devices 226 such as a flip sensor, keyboard, keypad, selection button, navigation cluster, touch pad, touchscreen, capacitive sensor, motion sensor, or switch. Actions that can actuate one or more of the input devices 210 can include not only the physical pressing/actuation of buttons or other actuators, but can also include, for example, opening the mobile device (if it can take on open or closed positions), unlocking the device, moving the device to actuate a motion, moving the device to actuate a location positioning system, and operating the device.

The mobile device 200 may also include one or more of various types of sensors 228. The sensors 228 can include, for example, proximity sensors (a light detecting sensor, an ultrasound transceiver or an infrared transceiver), touch sensors, altitude sensors, a location circuit that can include, for example, a Global Positioning System (GPS) receiver, a triangulation receiver, an accelerometer, a tilt sensor, a gyroscope, or any other information collecting device that can identify a current location or user-device interface (carry mode) of the mobile device 200. Although the sensors 228 are for the purposes of FIG. 12 considered to be distinct from the input devices 210, in other embodiments it is possible that one or more of the input devices can also be considered to constitute one or more of the sensors (and vice-versa). Additionally, even though in the present embodiment the input devices 210 are shown to be distinct from the output devices 208, it should be recognized that in some embodiments one or more devices serve both as input device(s) and output device(s). For example, in embodiments where a touchscreen is employed, the touchscreen can be considered to constitute both a visual output device and a mechanical input device.

The memory 206 of the mobile device 200 can encompass one or more memory devices of any of a variety of forms (e.g., read-only memory, random access memory, static random access memory, dynamic random access memory, etc.), and can be used by the processor 204 to store and retrieve data. In some embodiments, the memory 206 can be integrated with the processor 204 in a single device (e.g., a processing device including memory or processor-in-memory (PIM)), albeit such a single device will still typically have distinct portions/sections that perform the different processing and memory functions and that can be considered separate devices.

The data that is stored by the memory 206 can include, but need not be limited to, operating systems, applications, and informational data, such as a database. Each operating system includes executable code that controls basic functions of the communication device, such as interaction among the various components included among the mobile device 200, communication with external devices via the wireless transceivers 202 and/or the component interface 212, and storage and retrieval of applications and data, to and from the memory 206. In addition, the memory 206 can include one or more applications for execution by the processor 204. Each application can include executable code that utilizes an operating system to provide more specific functionality for the communication devices, such as file system service and the handling of protected and unprotected data stored in the memory 206. Informational data is non-executable code or information that can be referenced and/or manipulated by an operating system or application for performing functions of the communication device. One such application is a client application which is stored in the memory 206 and configured for performing the methods described herein. The memory 206 may, but need not, be used to implement the computer-readable memory 713 shown in FIG. 7.

The client application is intended to be representative of any of a variety of client applications that can perform the same or similar functions on any of various types of mobile devices, such as mobile phones, tablets, laptops, etc. The client application is a software-based application that operates on the processor 204 and is configured to provide an interface between one or more input devices 210, or one or more output devices 208, or any of various combinations thereof. In addition, the client application governs operation of one or more of the input and output devices 210, 208. Further, the client application may be configured to work in conjunction with a visual interface, such as a display screen, that allows a user of the mobile device 200 to initiate various actions. The client application can take any of numerous forms and, depending on the embodiment, be configured to operate on, and communicate with, various operating systems and devices. It is to be understood that various processes described herein as performed by the mobile device 200 can be performed in accordance with operation of the client application in particular, and/or other application(s), depending on the embodiment.

Figure 13:
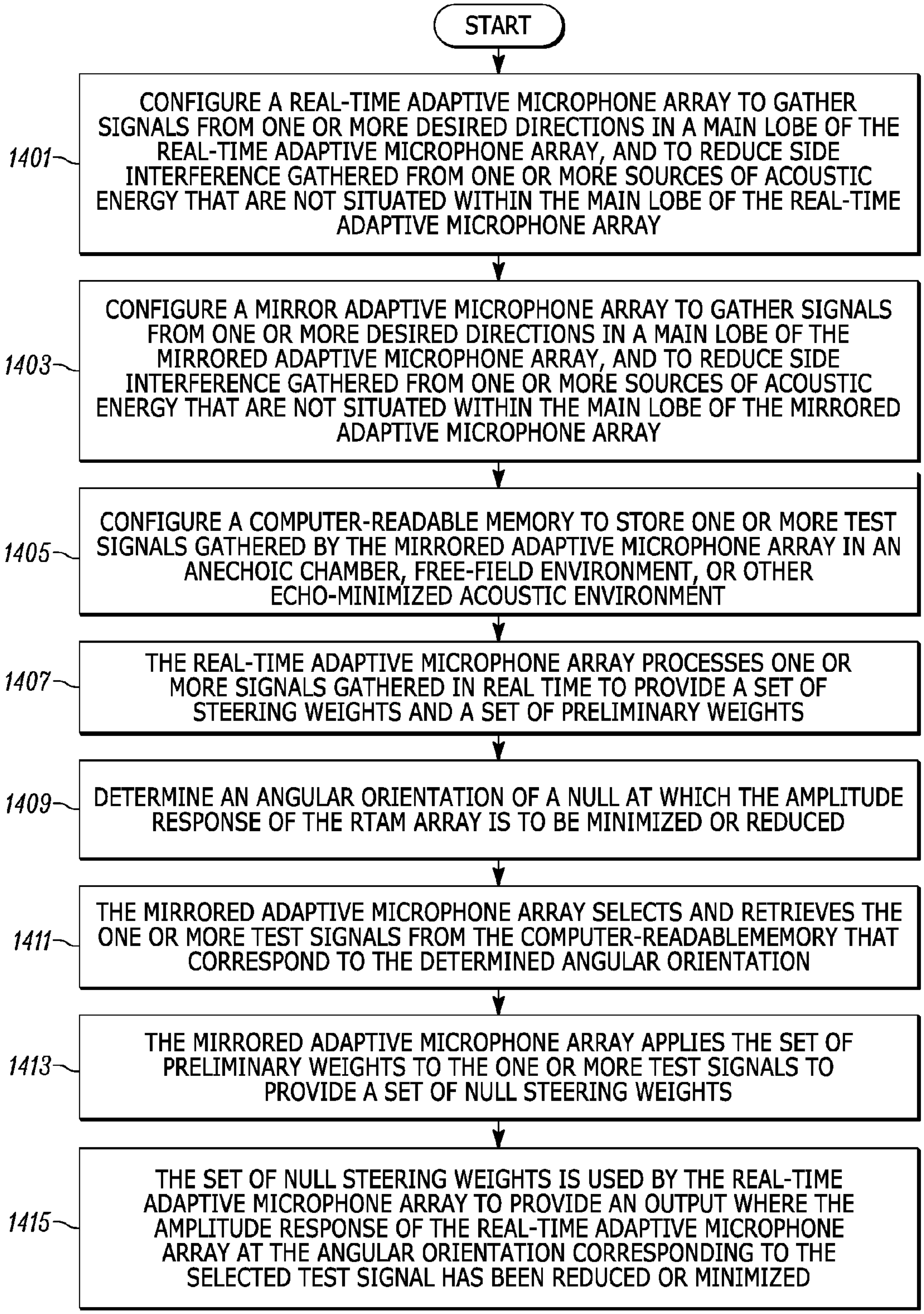
FIG. 13 is a flowchart showing an illustrative operational sequence for performing null steering of an adaptive microphone in accordance with a set of exemplary embodiments.

FIG. 13 is a flowchart showing an illustrative operational sequence for performing null steering of an adaptive microphone in accordance with a set of exemplary embodiments. The operational sequence commences at block 1401 where a real-time adaptive microphone (RTAM) array 600 (FIG. 6) is configured to gather signals from one or more directions in a main lobe of the RTAM array, and is also configured to reduce side interference gathered from one or more sources of acoustic energy that are not situated within the main lobe of the RTAM array. Likewise, at block 1403 (FIG. 13), a mirrored adaptive microphone (MAM) array 700 (FIG. 7) is configured to gather signals from one or more directions in a main lobe of the MAM array, and is also configured to reduce side interference gathered from one or more sources of acoustic energy that are not situated within the main lobe of the MAM array.

The operational sequence progresses to block 1405 (FIG. 13) where a computer-readable memory 713 (FIG. 7) is configured to store a respective plurality of test signals gathered by the MAM array 700 at a corresponding plurality of predetermined angular bearings with respect to the MAM array 700 in an anechoic chamber, free-field environment, or other interference and noise-free and echo-minimized acoustic environment, or from a mathematical model. Note that the procedure of block 1405 need only be performed once, during an initial tuning or set-up phase. Next, at block 1407 (FIG. 13), the RTAM array 600 (FIG. 6) processes a plurality of signals gathered in real time to provide a set of steering weights 611 and a set of preliminary weights 608.

At block 1409 (FIG. 13), an angular orientation of a null is determined at which an amplitude response of the RTAM array 600 (FIG. 6) is to be minimized or reduced relative to at least one other angular orientation. Next, at block 1411 (FIG. 13), the MAM array 700 (FIG. 7) selects and retrieves the one or more test signals from the computer-readable memory 713 that correspond to the determined angular orientation of the null. The computer-readable memory stores a plurality of respective recorded test signals that were obtained by the MAM array 700 (FIG. 7) at each of a plurality of corresponding angular orientations relative to the MAM array 700 under idealized test conditions. The intent is that, based on the desired angular orientation, a set of pilots/test signals is selected to drive the MAM array 700 to cancel a source in this orientation, deriving a configuration to be used on the RTAM array 600 (FIG. 6), steering the RTAM array 600 in a direction or directions as desired, rather than permitting the RTAM array to use adaptation to converge in a direction or directions, and without contaminating the output of the MAM array 700 (FIG. 7) with the pilot. The retrieving of one of the plurality of test signals at block 1411 (FIG. 13) may be performed by selecting a predetermined, default, or initial angular bearing for interference reduction, or by measuring received side interference and determining an angular bearing at which the side interference is strongest.

Since the MAM array 700 (FIG. 7) mirrors the RTAM array 600 (FIG. 6), the determined angular orientation for the RTAM array 600 (FIG. 6) and the plurality of corresponding angular orientations of the MAM array 700 (FIG. 7) may all be defined using the same frame of reference. This is because both the MAM array 700 and the RTAM array 600 (FIG. 6) operate on the same geometry of device/microphones and sources, resulting in solving a problem of identical geometry. Thus, selecting a given test signal that was recorded at a specific angular bearing with respect to the MAM array 700 (FIG. 7) will result in the mull of the RTAM array 600 (FIG. 6) being steered towards this specific angular bearing.

Illustratively, the selecting of the test signal may be performed by the RTAM array 600 (FIG. 6), or by the MAM array 700 (FIG. 7), or by a user, or by using a default setting stored in the computer-readable memory 713. Alternatively or additionally, a plurality of test signals corresponding to a plurality of different angular orientations may be selected in sequence or simultaneously, so as to provide an interference scan at a plurality of angular bearings for a given acoustic environment.

The operational sequence advances to block 1413 (FIG. 13) where the MAM array 700 (FIG. 7) applies the set of preliminary weights 608 to the retrieved test signal to provide the set of null steering weights 611. At block 1415, the null steering weights 611 are used by the RTAM array 600 (FIG. 6) to provide an RTAM array 600 output where the amplitude response of the RTAM array 600 at the angular orientation corresponding to the selected test signal has been reduced or minimized relative to at least one other angular orientation that does not correspond to the selected test signal.

Selection and retrieval of a particular test signal at block 1411 (FIG. 13) results in a null being steered towards a specific direction with reference to the RTAM array 600 (FIG. 6). This specific direction is determined by the direction for which the test signal was originally recorded and stored in the computer-readable memory 713 (FIG. 7) using the MAM array 700. Illustratively, the specific direction determined with reference to the RTAM array 600 (FIG. 6) is virtually identical to the direction for which the test signal was originally recorded with reference to the MAM array 700 (FIG. 7). Alternatively or additionally, the specific direction determined with reference to the RTAM array 600 (FIG. 6) is related to the direction for which the test signal was originally recorded with reference to the MAM array 700 (FIG. 7) by a fixed offset.

The operational sequence of FIG. 13 can be applied in situations where a source of undesired noise is at some known, measured, predicted, or determined angle with respect to the RTAM array 600 (FIG. 6). If the null steering weights 611 are to be derived for a noise source situated at a specific angle with respect to the RTAM array 600, then it may be desirable to obtain and store one or more test signals from the MAM array 700 (FIG. 7) at that angle. Pursuant to a further set of embodiments, an adaptive microphone system is provided where an angular bearing between an undesired source of noise and the RTAM array 600 (FIG. 6) can be varied, and test signals are stored in the computer-readable memory 713 (FIG. 7) for each of a plurality of angular bearings. The test signals are then employed by the RTAM array 600 (FIG. 6) and the MAM array 700 (FIG. 7) to perform an angular sweep or scan of a given acoustic environment. This angular sweep or scan may identify an angular bearing of the plurality of angular bearings at which noise received by the array is maximized. This identified angular bearing may subsequently be used by the RTAM array 600 (FIG. 6) and the MAM array 300 (FIG. 7) to steer a null of the RTAM array 600 (FIG. 6) in the direction of the identified angular bearing.

The aforementioned operational sequence of FIG. 13 is merely an example that is intended to be encompassed by the present disclosure. The present disclosure is intended to encompass numerous other manners of operation in addition to those specifically described previously. Numerous other examples of operation in accordance with the processes of FIG. 13, or variations of these processes, can be envisioned and are encompassed herein.

It should be appreciated that one or more embodiment encompassed by the present disclosure are advantageous in one or more respects. Thus, it is specifically intended that the present disclosure not be limited to the embodiments and illustrations contained herein, but include modified forms of those embodiments including portions of the embodiments and combinations of elements of different embodiments as come within the scope of the following claims.

What is claimed is:

1. A method comprising:

configuring an adaptive microphone array to gather signals from one or more directions in a main lobe of the array;

configuring the array to reduce side interference gathered from one or more sources of acoustic energy that are not situated within the main lobe of the array;

configuring a computer-readable memory to store a plurality of respective test signals gathered by the array at a corresponding plurality of predetermined angular bearings with reference to the array;

processing one or more signals gathered in real time to provide a preliminary output signal and a set of preliminary weights;

determining an angular orientation with reference to the array at which an amplitude response of the array is to be reduced or minimized;

retrieving a test signal from the plurality of respective test signals stored in the computer-readable memory based upon the determined angular orientation;

applying the set of preliminary weights to the retrieved test signal to provide a set of null steering weights; and processing the set of null steering weights and the preliminary output signal to reduce or minimize the amplitude response of the array at the angular orientation.

2. The method of claim 1 further comprising gathering the one or more test signals in an anechoic chamber, a free-field environment, or an interference and noise free and echo-minimized acoustic environment, or obtaining the one or more test signals from a mathematical model.

3. The method of claim 2 wherein the one or more test signals comprise white noise, pink noise, broad-band noise, a sinusoidal signal, a test signal, pseudo-speech, or any of various combinations thereof.

4. The method of claim 1 further comprising obtaining the gathered signals from the one or more directions in the main lobe using a real-time adaptive microphone array.

5. The method of claim 4 further comprising obtaining the plurality of respective test signals using a mirrored adaptive microphone array.

6. The method of claim 5 further comprising selecting a first set of microphones for the real-time adaptive microphone array and selecting a second set of microphones for the mirrored adaptive microphone array.

7. The method of claim 1 further comprising:

varying an angle between an undesired source of noise and the array;

storing test signals in the computer-readable memory for each of a plurality of angular bearings determined with reference to the array;

using the stored test signals to perform an angular sweep or scan of an acoustic environment to identify an angular bearing of the plurality of angular bearings at which noise received by the array is maximized; and steering a null of the array in the direction of the identified angular bearing.

8. An apparatus comprising:

an adaptive microphone array configured to gather signals from one or more desired directions in a main lobe of the array, and configured to reduce side interference gathered from one or more sources of acoustic energy that are not situated within the main lobe of the array; and a computer-readable memory, operatively coupled to the array, and configured to store a respective plurality of test signals gathered by the array at a corresponding plurality of predetermined angular bearings with reference to the array;

wherein the array further comprises a processing mechanism for processing one or more signals gathered in real time to provide a preliminary output signal and a set of preliminary weights; determining an angular orientation with reference to the array at which an amplitude response of the array is to be reduced or minimized; retrieving a test signal from the plurality of respective test signals stored in the computer-readable memory based upon the determined angular orientation; applying the set of preliminary weights to the retrieved test signal to provide a set of null steering weights; and processing the set of null steering weights and the preliminary output signal to reduce or minimize the amplitude response of the array at the angular orientation.

9. The apparatus of claim 8 wherein the one or more test signals are obtained by recording a source of acoustic energy in an anechoic chamber, or a free-field environment, or an interference and noise-free and echo-minimized acoustic environment or obtained from a mathematical model.

10. The apparatus of claim 9 wherein the source of acoustic energy comprises pink noise, white noise, broad-band noise, a sinusoidal signal, a test signal, pseudo-speech, or any of various combinations thereof.

11. The apparatus of claim 8 wherein the array comprises a real-time adaptive microphone array configured for gathering one or more signals from the one or more desired directions.

12. The apparatus of claim 11 wherein the array further comprises a mirrored adaptive microphone array configured for obtaining and storing the test signals.

13. The apparatus of claim 12 further comprising selecting a first set of microphones for the real-time adaptive microphone array and selecting a second set of microphones for the mirrored adaptive microphone array.

14. The apparatus of claim 8 wherein:

an angle between an undesired source of noise and the array is varied;

test signals are stored in the computer-readable memory for each of a plurality of angular bearings determined with reference to the array;

the stored test signals are used to perform an angular sweep or scan of an acoustic environment to identify an angular bearing of the plurality of angular bearings at which noise received by the array is maximized; and a null of the array is steered in the direction of the identified angular bearing.

15. A non-transitory computer-readable memory encoded with a computer program comprising computer readable instructions recorded thereon for execution of a method that includes:

configuring an adaptive microphone array to gather signals from one or more directions in a main lobe of the array;

configuring the array to reduce side interference gathered from one or more sources of acoustic energy that are not situated within the main lobe of the array;

configuring a computer-readable memory to store a plurality of respective test signals gathered by the array at a corresponding plurality of predetermined angular bearings with reference to the array;

processing one or more signals gathered in real time to provide a preliminary output signal and a set of preliminary weights;

determining an angular orientation with reference to the array at which an amplitude response of the array is to be reduced or minimized;

retrieving a test signal from the plurality of respective test signals stored in the computer-readable memory based upon the determined angular orientation;

applying the set of preliminary weights to the retrieved test signal to provide a set of null steering weights; and processing the set of null steering weights and the preliminary output signal to reduce or minimize the amplitude response of the array at the angular orientation.

16. The non-transitory computer-readable memory of claim 15 further comprising instructions for gathering the one or more test signals in an anechoic chamber, a free-field environment, or an interference and noise-free and echo-minimized acoustic environment or obtaining the one or more test signals from a mathematical model.

17. The non-transitory computer-readable memory of claim 16 further comprising instructions for obtaining the one or more test signals using white noise, pink noise, band-limited noise, a sinusoidal signal, a test signal, pseudo-speech, or any of various combinations thereof.

18. The non-transitory computer-readable memory of claim 15 further comprising instructions for obtaining the gathered signals from the one or more desired directions using a real-time adaptive microphone array.

19. The non-transitory computer-readable memory of claim 18 further comprising instructions for obtaining the stored test signals using a mirrored adaptive microphone array.

20. The non-transitory computer-readable memory of claim 19 further comprising instructions for selecting a first set of microphones for the real-time adaptive microphone array and selecting a second set of microphones for the mirrored adaptive microphone array.

21. The non-transitory computer-readable memory of claim 15 further comprising instructions for:

varying an angle between an undesired source of noise and the array;

storing test signals in the computer-readable memory for each of a plurality of angular bearings determined with reference to the array;

using the stored test signals to perform an angular sweep or scan of an acoustic environment to identify an angular bearing of the plurality of angular bearings at which noise received by the array is maximized; and steering a null of the array in the direction of the identified angular bearing.

* * * * *